US008230317B2

United States Patent
Amann et al.

(10) Patent No.: US 8,230,317 B2
(45) Date of Patent: *Jul. 24, 2012

(54) DATA PROTECTION METHOD FOR VARIABLE LENGTH RECORDS BY UTILIZING HIGH PERFORMANCE BLOCK STORAGE METADATA

(75) Inventors: Stefan Amann, Boeblingen (DE); Gerhard Banzhaf, Nufringen (DE); Kenneth Wayne Boyd, Tucson, AZ (US); Kenneth Fairclough Day, III, Tucson, AZ (US); Jeffrey William Palm, Rochester, MN (US); Helmut H. Weber, Dettenhausen (DE); Harry Morris Yudenfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1139 days.

This patent is subject to a terminal disclaimer.

(21) Appl. No.: 12/100,249

(22) Filed: Apr. 9, 2008

(65) Prior Publication Data

US 2009/0259924 A1    Oct. 15, 2009

(51) Int. Cl.
G06F 11/00    (2006.01)

(52) U.S. Cl. ......................................................... 714/807
(58) Field of Classification Search .................... 714/807
See application file for complete search history.

(56) References Cited

U.S. PATENT DOCUMENTS

| 5,200,864 A | 4/1993 | Dunn et al. |
| 5,301,304 A | 4/1994 | Menon |
| 5,848,026 A | 12/1998 | Ramamurthy et al. |
| 5,951,691 A * | 9/1999 | Ng et al. ........................ 714/5.11 |
| 6,260,124 B1 | 7/2001 | Crockett et al. |
| 6,297,891 B1 * | 10/2001 | Kara ............................... 358/405 |
| 6,324,620 B1 | 11/2001 | Christenson et al. |
| 6,438,646 B1 * | 8/2002 | Kitamura et al. .............. 711/112 |
| 6,748,486 B2 * | 6/2004 | Burton et al. .................. 711/112 |
| 6,775,693 B1 * | 8/2004 | Adams ........................... 709/213 |
| 6,874,092 B1 | 3/2005 | Motoyama et al. |

(Continued)

OTHER PUBLICATIONS

Gerald Houlder, "Data Integrity Proposal", Document T10/03-110r0, T10 technical committee of the InterNational Committee for Information Technology Standards (INCITS), Mar. 7, 2003, 17 pages. (http://www.t10.org/ftp/t10/document.03/03-110r0.pdf).

(Continued)

Primary Examiner — Scott Baderman
Assistant Examiner — Yair Leibovich
(74) Attorney, Agent, or Firm — Matthew J. Bussan

(57) ABSTRACT

An enhanced mechanism for providing data protection for variable length records utilizes high performance block storage metadata. In an embodiment, an emulated record that emulates a variable length record, such as a Count-Key-Data (CKD) record or an Extended-Count-Key-Data (ECKD) record, is generated by a Host Bus Adapter (HBA) of a mainframe system. The emulated record comprises a sequence of extended fixed-length blocks, each of which includes a data block and a footer. A confluence of the footers defines a high performance block storage metadata unit associated with the emulated record and includes a checksum that covers all data blocks and all footers of the entire emulated record. In one embodiment, the checksum is checked during transit of the emulated record between a HBA and a storage subsystem (e.g., by the HBA when the emulated record is received from the storage subsystem, and/or by a switch in the data transfer path), during a hardening step when writing the emulated record to a disk, and/or during a verification step when reading the emulated record from the disk.

22 Claims, 15 Drawing Sheets

U.S. PATENT DOCUMENTS

| | | | |
|---|---|---|---|
| 6,941,432 | B2 | 9/2005 | Ronstrom |
| 7,139,863 | B1 | 11/2006 | Defouw et al. |
| 7,310,316 | B2 * | 12/2007 | Auerbach ............... 340/11.1 |
| 2002/0162014 | A1 | 10/2002 | Przydatek et al. |
| 2003/0023933 | A1 * | 1/2003 | Duncan .................. 714/807 |
| 2005/0076226 | A1 | 4/2005 | Boivie et al. |
| 2006/0129901 | A1 | 6/2006 | Arataki et al. |
| 2006/0206680 | A1 | 9/2006 | Yamanaka et al. |
| 2007/0050542 | A1 | 3/2007 | Benhase et al. |
| 2007/0083697 | A1 | 4/2007 | Birrell et al. |
| 2007/0101096 | A1 | 5/2007 | Gorobets |
| 2008/0024835 | A1 | 1/2008 | Harano |
| 2008/0288712 | A1 | 11/2008 | Cornwell et al. |
| 2008/0294935 | A1 | 11/2008 | Ni et al. |
| 2009/0100212 | A1 | 4/2009 | Boyd et al. |
| 2009/0259456 | A1 * | 10/2009 | Amann et al. ............ 703/23 |
| 2010/0146228 | A1 | 6/2010 | Kanno et al. |
| 2010/0157671 | A1 | 6/2010 | Mokhlesi |

OTHER PUBLICATIONS

Gerald Houlder, "End to End Data Protection", Document T10/03-110r1, T10 technical committee of the InterNational Committee for Information Technology Standards (INCITS), May 7, 2003, 18 pages. (http://www.t10.org/ftpft10/document.03/03-110r1.pdf).

Gerald Houlder, Document T10/03-111r0, T10 technical committee of the InterNational Committee for Information Technology Standards (INCITS), 2003, 18 pages. (http://www.t10.org/ftp/t10/document.03/03-111r0.pdf).

George Penokie, "End-to-End Data Protection", Document T10/03-176r0, T10 technical committee of the InterNational Committee for Information Technology Standards (INCITS), May 1, 2003, pp. 95-101. (http://www.t10.org/ftp/t10/document.03/03-176r0.pdf).

Kieth Holt, "End-to-End Data Protection Justification", Document T10/03-224r0, T10 technical committee of the InterNational Committee for Information Technology Standards (INCITS), Jul. 1, 2003, 7 pages. (http://www.t10.org/ftp/t10/document.03/03-176r0.pdf).

David Broom et al., "Protecting Oracle Data Integrity: Hitachi Database Validator Technology and the Hitachi Freedom Storage Lightning 9900 V Series Systems", Technical White Paper, Hitachi Data Systems, Jan. 2003, 12 pages. (http://www.hds.com/assets/pdf/wp127_01_dbvalidator.pdf).

Narayan Ayalasomayajula et al., "DIF (Data Integrity Field): Provides End-to-End Protection of User Data", White Paper, Agilent Technologies, Aug. 31, 2004, 6 pages. (http://cp.literature.agilent.com/litweb/pdf/5989-0892EN.pdf).

J. Brown et al., "Oracle's Hardware Assisted Resilient Data (H.A.R.D.)", Nov. 16, 2001, 5 pages. (http://www.oracle.com/technology/deploy/availability/htdocs/hard_metalink_note_158367.pdf).

"Emulex, LSI, Oracle and Seagate Collaborate to Reduce System Downtime with Groundbreaking Data Integrity Initiative", Press Release, Emulex Corporation, Apr. 18, 2007, 2 pages. (http://www.emulex.com/press/2007/0418-01.jsp).

U.S. Appl. No. 11/871,532, to Boyd et al., entitled "Method, Apparatus, Computer Program Product, and Data Structure for Providing and Utilizing High Performance Block Storage Metadata", filed Oct. 12, 2007, assigned to International Business Machines Corporation.

U.S. Appl. No. 12/100,237, to Amann et al., entitled "Data Protection for Variable Length Records by Utilizing High Performance Block Storage Metadata", filed Apr. 9, 2008, assigned to International Business Machines Corporation.

Boris Y. Chan et al., "A Framework for Cache Management for Mobile Databases: Design and Evaluation," 2001, Kluwer, Distributed and Parallel Databases, vol. 10, pp. 23-57.

Apple, "AppleSingle/AppleDouble Formats for Foreign Files Developer's Note," 1990, Apple.

Jen-Wei Hsieh et al., "Efficient Identification of Hot Data for Flash Memory Storage Systems," Feb. 2006, ACM, ACM Transactions on Storage, vol. 2, pp. 22-40.

Hung-Wei Tseng et al., "An Energy-Efficient Virtual Memory System with Flash Memory as the Secondary Storage," Oct. 2006, ACM, ISLPED '06.

* cited by examiner

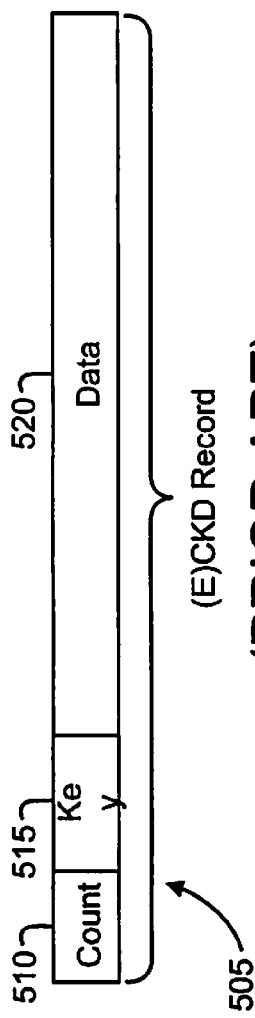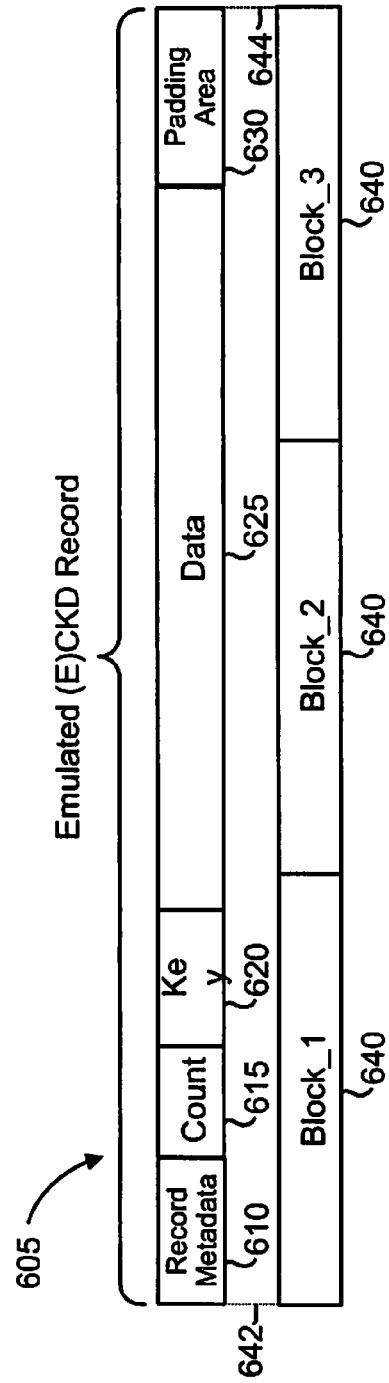
FIG. 5 (PRIOR ART)
FIG. 6 (PRIOR ART)

DATA PROTECTION METHOD FOR VARIABLE LENGTH RECORDS BY UTILIZING HIGH PERFORMANCE BLOCK STORAGE METADATA

CROSS-REFERENCE TO RELATED APPLICATIONS

This patent application is related to pending U.S. Ser. No. 11/871,532, filed Oct. 12, 2007, entitled "METHOD, APPARATUS, COMPUTER PROGRAM PRODUCT, AND DATA STRUCTURE FOR PROVIDING AND UTILIZING HIGH PERFORMANCE BLOCK STORAGE METADATA", which is assigned to the assignee of the instant application.

This patent application is also related to pending U.S. Ser. No. 12/100,237, filed concurrently, entitled "DATA PROTECTION FOR VARIABLE LENGTH RECORDS BY UTILIZING HIGH PERFORMANCE BLOCK STORAGE METADATA", which is assigned to the assignee of the instant application.

BACKGROUND OF THE INVENTION

1. Field of Invention

The present invention relates in general to the digital data processing field and, in particular, to block data storage (i.e., data storage organized and accessed via blocks of fixed size). More particularly, the present invention relates to a mechanism for the utilization of high performance block storage metadata in the context of data protection for variable length records, such as Count-Key-Data (CKD) and Extended-Count-Key-Data (ECKD).

2. Background Art

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises at least one central processing unit (CPU) and supporting hardware, such as communications buses and memory, necessary to store, retrieve and transfer information. It also includes hardware necessary to communicate with the outside world, such as input/output controllers or storage controllers, and devices attached thereto such as keyboards, monitors, tape drives, disk drives, communication lines coupled to a network, etc. The CPU or CPUs are the heart of the system. They execute the instructions which comprise a computer program and direct the operation of the other system components.

The overall speed of a computer system is typically improved by increasing parallelism, and specifically, by employing multiple CPUs (also referred to as processors). The modest cost of individual processors packaged on integrated circuit chips has made multiprocessor systems practical, although such multiple processors add more layers of complexity to a system.

From the standpoint of the computer's hardware, most systems operate in fundamentally the same manner. Processors are capable of performing very simple operations, such as arithmetic, logical comparisons, and movement of data from one location to another. But each operation is performed very quickly. Sophisticated software at multiple levels directs a computer to perform massive numbers of these simple operations, enabling the computer to perform complex tasks. What is perceived by the user as a new or improved capability of a computer system is made possible by performing essentially the same set of very simple operations, using software having enhanced function, along with faster hardware.

Computer systems typically store data on disks of a hard disk drive (HDD). A hard disk drive is commonly referred to as a hard drive, disk drive, or direct access storage device (DASD). A hard disk drive is a non-volatile storage device that stores digitally encoded data on one or more rapidly rotating disks (also referred to as platters) with magnetic surfaces.

One or more hard disk drives may be enclosed in the computer system itself, or may be enclosed in a storage subsystem that is operatively connected with the computer system. A modern mainframe computer typically utilizes one or more storage subsystems with large disk arrays that provide efficient and reliable access to large volumes of data. Examples of such storage subsystems include network attached storage (NAS) systems and storage area network (SAN) systems. Disk arrays are typically provided with cache memory and advanced functionality such as RAID (redundant array of independent disks) schemes and virtualization.

Mainframe data stored on disks is typically organized in the Count-Key-Data (CKD) format or the Extended-Count-Key-Data (ECKD) format. Both of these formats organize data in cylinders, wherein each cylinder consists of a fixed number of tracks, and each track is composed of a varying number of variable length records.

In the early days of mainframe computers, disk drives were built wherein the physical disk organization matched the logical data organization of the CKD and ECKD formats. Modern disk drives, which utilize different technologies and protocols, such as SCSI (small computer system interface), SAS (serial attached SCSI), and SATA (serial advanced technology attachment), and the like, all have in common that data on the disk is organized in fixed-length blocks. The typical formatting of a disk provides a block size of 512 bytes. Thus, mainframe data organized in the CKD and ECKD formats need to be emulated on fixed-block disks, and accessed using the appropriate fixed-block based protocol.

This emulation may be done in a storage subsystem that encloses the fixed-block disks, or on the mainframe computer that has a need to access the data, or on some intermediate unit in the path between the mainframe computer and the storage subsystem. Whenever this emulation is performed outside the storage subsystem, data are transmitted between the unit hosting the emulation function (referred to herein as an "emulating host") and the storage subsystem in fixed-block format.

One of the basic requirements for storing mainframe data on disks in the storage subsystem is to ensure data integrity. In particular, data integrity must be protected on the path between the emulating host and a disk in the storage subsystem.

There are no standard methods to provide data protection for mainframe data organized in the CKD and ECKD formats when the data are transmitted using fixed-length block based protocols between the emulating host and a disk in the storage subsystem. There are, however, conventional mechanisms for adding metadata to fixed-block data for data protection purposes. Such conventional mechanisms, which include Oracle's Hardware Assisted Resilient Data (HARD) architecture and the T10 End-to-End Data Protection architecture, unfortunately suffer important drawbacks as discussed below.

FIG. 1 is a schematic diagram illustrating an example data structure for a conventional sequence 100 (referred to as a "page") of fixed-length blocks 102 (e.g., 512 bytes). Typically, for performance reasons no metadata is associated with any particular one of the blocks 102 or the page 100 unless such metadata is written within the blocks 102 by an application. Metadata is information describing, or instructions regarding, the associated data blocks. Although there has been recognition in the digital data processing field of the need for high performance block storage metadata to enable new applications, such as data integrity protection, attempts to address this need have met with limited success. Two notable attempts to address this need for high performance block storage metadata are Oracle's Hardware Assisted Resilient Data (HARD) architecture and the T10 End-to-End Data Protection architecture.

The T10 End-to-End (ETE) Data Protection architecture is described in various documents of the T10 technical committee of the InterNational Committee for Information Technology Standards (INCITS), such as T10/03-100r0, T10/03-111r0 and T10/03-176r0. As discussed in more detail below, two important drawbacks of the current T10 ETE Data Protection architecture are: 1) no protection is provided against "stale data"; and 2) very limited space is provided for metadata.

FIG. 2 is a schematic diagram illustrating an example data structure for a conventional sequence 200 (referred to as a "page") of fixed-size blocks 202 in accordance with the current T10 ETE Data Protection architecture. Each fixed-size block 202 includes a data block 210 (e.g., 512 bytes) and a T10 footer 212 (8 bytes). Each T10 footer 212 consists of three fields, i.e., a Ref Tag field 220 (4 bytes), a Meta Tag field 222 (2 bytes), and a Guard field 224 (2 bytes). The Ref Tag field 220 is a four byte value that holds information identifying within some context the particular data block 210 with which that particular Ref Tag field 220 is associated. Typically, the first transmitted Ref Tag field 220 contains the least significant four bytes of the logical block address (LBA) field of the command associated with the data being transmitted. During a multi-block operation, each subsequent Ref Tag field 220 is incremented by one. The Meta Tag field 222 is a two byte value that is typically held fixed within the context of a single command. The Meta Tag field 222 is generally only meaningful to an application. For example, the Meta Tag field 222 may be a value indicating a logical unit number in a Redundant Array of Inexpensive/Independent Disks (RAID) system. The Guard field 224 is a two byte value computed using the data block 210 with which that particular Guard field 224 is associated. Typically, the Guard field 224 contains the cyclic redundancy check (CRC) of the contents of the data block 210 or, alternatively, may be checksum-based.

It is important to note that under the current T10 ETE Data Protection architecture, metadata is associated with a particular data block 202 but not the page 200. The T10 metadata that is provided under this approach has limited usefulness. The important drawbacks of the current T10 ETE Data Protection architecture mentioned above [i.e., 1) no protection against "stale data"; and 2) very limited space for metadata] find their origin in the limited usefulness of the metadata that is provided under this scheme. First, the current T10 approach allows only 2 bytes (i.e., counting only the Meta Tag field 222) or, at best, a maximum of 6 bytes (i.e., counting both the Ref Tag field 220 and the Meta Tag field 222) for general purpose metadata space, which is not sufficient for general purposes. Second, the current T10 approach does not protect against a form of data corruption known as "stale data", which is the previous data in a block after data written over that block was lost, e.g., in transit, from write cache, etc. Since the T10 metadata is within the footer 212, stale data appears valid and is therefore undetectable as corrupted.

To address the latter one of these drawbacks (i.e., very limited space for metadata), it is known to include an Unguarded Data Field (UDF) (e.g., 4, 8, 12, . . . , 32 bytes) between the data block 210 and the T10 footer 212. Such a UDF is a multiple byte (e.g., four byte multiples) value that indicates identification information. For example, the UDF may be a software stamp to indicate creator, data type, creation and/or last modification data, data path, or other identification information. See, for example, document T10/03-10r1 of the T10 technical committee of the INCITS. Again, it is important to note that under this enhanced-version of the current ETE Data Protection architecture, metadata is associated with a particular data block 202 but not the page 200. Moreover, the metadata that is provided under this enhanced scheme does not address the other drawback, i.e., no protection is provided against "stale data".

Oracle's Hardware Assisted Resilient Data (HARD) architecture is a proprietary architecture the sole purpose of which is to protect Oracle databases from undetected data corruption. Two important drawbacks of Oracle's HARD architecture are: 1) it is proprietary; and 2) as discussed in more detail below, it is limited to only Oracle database applications.

Oracle's HARD architecture is applicable only to Oracle database applications. The HARD architecture does not provide a general purpose architecture for block storage metadata and cannot be used for applications beyond protecting Oracle databases. The HARD architecture is implemented in the server at the application level, where protection metadata is contained within standard blocks, not block extensions. An Oracle database application has functionality to add check data to each data block when issuing write requests. This check data is examined and validated at each read operation of the Oracle database application. To prevent corrupted data blocks generated in the database-to-storage system infrastructure from being written onto the storage disk, it is known to integrate Oracle's data integrity checksum algorithms at the microchip and microcode level into storage systems, such as the Hitachi Freedom Storage Lightning 9900 V Series System. This provides additional verification of the Oracle check data on the storage system side. See, for example, David Broom and Rasha Hasaneen, Technical White Paper entitled "Protecting Oracle Data Integrity: Hitachi Database Validator Technology and the Hitachi Freedom Storage Lightning 9900 V Series Systems", Hitachi Data Systems, January, 2003. {www.hds.com/assets/pdf/wp127_01_db-validator.pdf}. Nonetheless, even when Oracle's HARD architecture is enhanced by integrating Oracle's data integrity checksum algorithms into storage systems, the HARD architecture is still only applicable only to Oracle database applications.

Therefore, a need exists for an enhanced mechanism for providing data protection for variable length records, such as mainframe data organized in the CKD and ECKD formats.

SUMMARY OF THE INVENTION

According to the preferred embodiments of the present invention, an enhanced mechanism for providing data protection for variable length records utilizes high performance block storage metadata. In an embodiment, an emulated record that emulates a variable length record, such as a Count-Key-Data (CKD) record or an Extended-Count-Key-Data (ECKD) record, is generated by a Host Bus Adapter (HBA) of a mainframe system. In alternative embodiments, the emulated record is generated by other devices, such as a storage controller of a storage subsystem, a storage area network device, or a storage virtualization device. The emulated record comprises a sequence of extended fixed-length blocks, each of which includes a data block and a footer. A confluence of the footers defines a high performance block storage metadata unit associated with the emulated record and includes a checksum that covers all data blocks and all footers of the entire emulated record. In one embodiment, the checksum is checked during transit of the emulated record between a HBA and a storage subsystem (e.g., by the HBA when the emulated record is received from the storage subsystem, and/or by a switch in the data transfer path), during a hardening step when writing the emulated record to a disk, and/or during a verification step when reading the emulated record from a disk.

In an illustrative embodiment, to ensure end-to-end protection for data being transmitted between a host system (e.g., a mainframe system) and a storage subsystem, the emulated record is generated on the host system (e.g., by a HBA of the host system) and the checksum is checked on the host system (e.g., by the HBA) when the emulated record is inbound to the host system from the storage subsystem (e.g., after being read from a disk drive). Preferably, the checksum is also checked by the storage subsystem (e.g., by a storage controller of the storage subsystem) to verify the integrity of the emulated record before the emulated record is hardened on disk. If the integrity check fails, the storage subsystem requests the host system to retransmit the emulated record. Preferably, the checksum is also checked by the storage subsystem (e.g., by the storage controller) to verify the integrity of the emulated record when the emulated record is read from disk. The checksum may also be checked at additional points along the transfer path (e.g., by one or more switches) to help identify weak spots in the transfer path.

The foregoing and other features and advantages of the invention will be apparent from the following more particular description of the preferred embodiments of the invention, as illustrated in the accompanying drawings.

BRIEF DESCRIPTION OF THE DRAWINGS

The preferred exemplary embodiments of the present invention will hereinafter be described in conjunction with the appended drawings, where like designations denote like elements.

FIG. 5 is a schematic diagram illustrating an exemplary data structure's conventional organization of (E)CKD formatted data in the context of a single record.

FIG. 6 is a schematic diagram illustrating an exemplary data structure's conventional organization of (E)CKD formatted data in the context of an emulated (E)CKD record mapped to a number of fixed-length blocks.

DETAILED DESCRIPTION OF THE PREFERRED EMBODIMENTS 1.0 Overview

In accordance with the preferred embodiments of the present invention, an enhanced mechanism for providing data protection for variable length records utilizes high performance block storage metadata. In one embodiment, an emulated record that emulates a variable length record, such as a Count-Key-Data (CKD) record or an Extended-Count-Key-Data (ECKD) record, is generated by a Host Bus Adapter (HBA) of a mainframe system. The emulated record comprises a sequence of extended fixed-length blocks, each of which includes a data block and a footer. A confluence of the footers defines a high performance block storage metadata unit associated with the emulated record and includes a checksum that covers all data blocks and all footers of the entire emulated record. In various embodiments, the checksum is checked during transit of the emulated record to and/or from a storage subsystem (e.g., by the HBA when the emulated record is received from the storage subsystem, and/or by a switch in the data transfer path), during a hardening step when writing the emulated record to a disk, and/or during a verification step when reading the emulated record from a disk.

2.0 Detailed Description

As mentioned earlier, mainframe data stored on disks is typically organized in the Count-Key-Data (CKD) format or the Extended-Count-Key-Data (ECKD) format. Both of these formats are collectively referred to herein as the (E)CKD format. A brief review of these formats is set forth below with reference to FIGS. 3-5, along with a brief review of conventional techniques for emulating mainframe data organized in the (E)CKD format on fixed-block disks with reference to FIGS. 6 and 7. At least one implementation of the preferred embodiments of the present invention is described herein in the context of emulated variable length records translated from mainframe data organized in the (E)CKD format. However, those skilled in the art will appreciate that the method, apparatus, computer program product, and data structure of the present invention apply equally to any type of data organized in any variable length format.

Both of the Count-Key-Data format and the Extended-Count-Key-Data format organize data in cylinders, wherein each cylinder consists of a fixed number of tracks, and each track is composed of a varying number of variable length records. The records in ECKD format are formatted just as in the CKD format. In the ECKD format, however, the physical track is the smallest unit. Thus with the ECKD format, the records on the track, although formatted just as in CKD, are written as a unit in a single operation.

Figure 3:
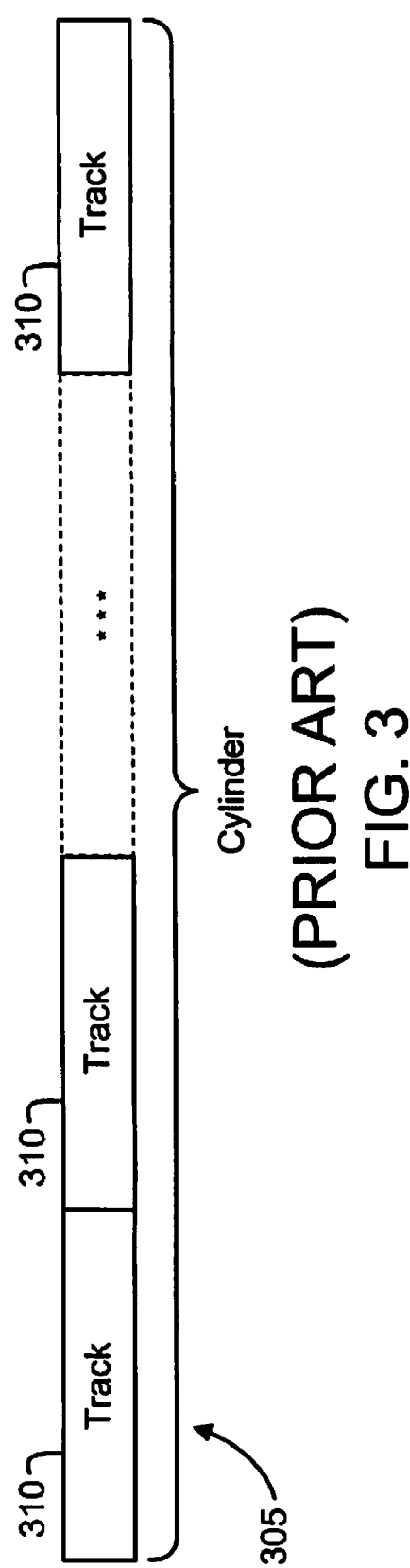
FIG. 3 is a schematic diagram illustrating an exemplary data structure's conventional organization of (E)CKD formatted data in the context of cylinders and tracks.

Referring now to FIG. 3, which is a schematic diagram illustrating an exemplary data structure's conventional organization of (E)CKD formatted data in the context of cylinders and tracks, a cylinder 305 consists of multiple tracks 310. Typically, the cylinder 305 consists of fifteen of the tracks 310, but this number may vary. The tracks 310 and the cylinders 305 are of fixed length.

Figure 4:
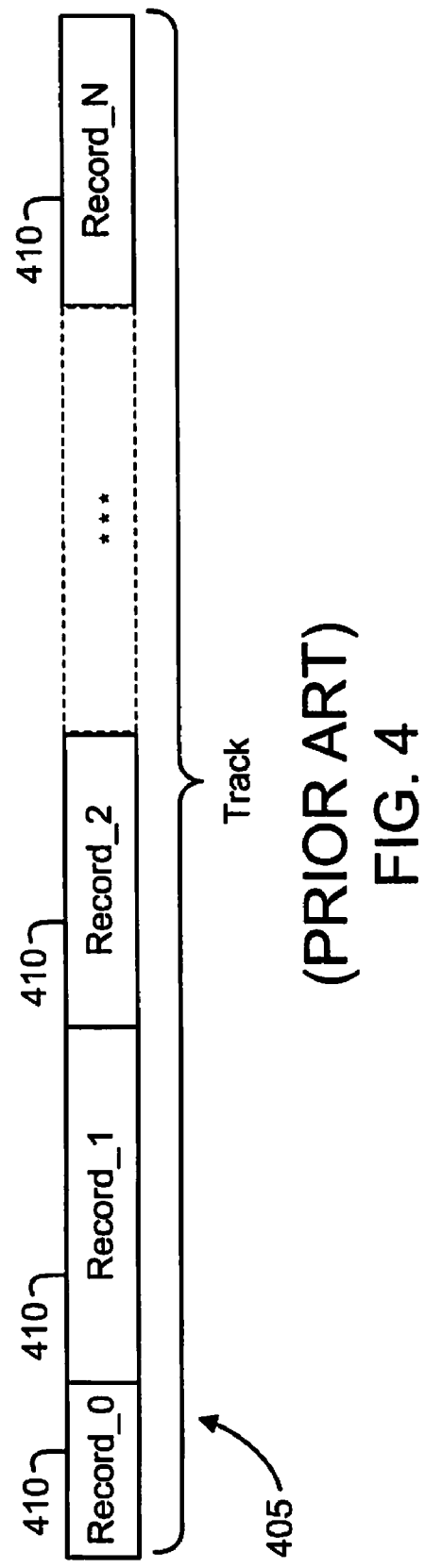
FIG. 4 is a schematic diagram illustrating an exemplary data structure's conventional organization of (E)CKD formatted data in the context of tracks and records.

Referring now to FIG. 4, which is a schematic diagram illustrating an exemplary data structure's conventional organization of (E)CKD formatted data in the context of tracks and records, a track 405 consists of multiple records 410. The track 405 in FIG. 4 corresponds with the track 310 in FIG. 3. Typically, the track 405 consists of one to ninety-four of the records 410. The records 410 may be variable in length. Typically, the track 405 contains up to approximately 56K Bytes of data.

Referring now to FIG. 5, which is a schematic diagram illustrating an exemplary data structure's conventional organization of (E)CKD formatted data in the context of a single record, a record 505 consists of up to three component fields in the following order: a Count field 510; an optional Key field 515; and a Data field 520. The order of the component fields in the (E)CKD record 505 is fixed. The Count field 510 is a fixed-length field. The Key field 515, which is optional, is a variable length field. The Data field 520 is a variable length field. The Count field 510 typically contains an identification of the physical location in cylinder-head-record format, the length of the Key field 515 (if used), and the length of the (E)CKD record 505. The Key field 515, if used, typically describes the content of the record. For example, the Key field 515 may contain the first n bytes of the data record or any other data that can be used to find the (E)CKD record. Typically, the Key field 515, if used, is application specific.

The (E)CKD record 505 is the smallest unit of data that is written or read according to the (E)CKD protocol. However, an (E)CKD I/O operation may as well comprise multiple, consecutive (E)CKD records 505. For example, as mentioned above, with the Extended-Key-Count-Data format, the (E)CKD records 505 on the track are written as a unit in a single operation. Referring temporarily back to FIG. 4, for example, with the Extended-Key-Count-Data format, the ECKD records 410 (i.e., Record_0, Record_1, Record_2, . . . , Record_N) on the track 405 are written as a unit.

Referring now to FIG. 6, which is a schematic diagram illustrating an exemplary data structure's conventional organization of (E)CKD formatted data in the context of an emulated (E)CKD record mapped to a number of fixed-length blocks, an emulated (E)CKD record 605 contains a Record Metadata field 610, a Count field 615, an optional Key field 620, a Data field 625, and a Padding Area 630.

At least one Record Metadata field, such as the Record Metadata field 610 shown in FIG. 6, is often present in an emulated (E)CKD record. However, this field may be omitted, or may be relocated with respect to the location of the Record Metadata field 610 shown in FIG. 6. Typically, an emulated (E)CKD record contains record metadata located at the beginning of the (E)CKD record (e.g., in the Record Metadata field 610 shown in FIG. 6) and/or the end of the emulated (E)CKD record. The record metadata contained in the Record Metadata field may include, for example, mapping information utilized by an emulation program.

The Count field 615, the optional Key field 620 and the Data field 625 of the emulated (E)CKD record 605 shown in FIG. 6 respectively correspond to the Count field 510, the optional Key field 515, and the Data field 520 of the (E)CKD record 505 shown in FIG. 5.

At least one padding area, such as the Padding Area 630 shown in FIG. 6, is often present in an emulated (E)CKD record. However, the padding area may be omitted, or may be relocated with respect to the location of the Padding Area 630 shown in FIG. 6. Typically, an emulated (E)CKD contains a padding area to achieve block boundary alignment, as discussed below. If present, the padding area is located at the beginning of the (E)CKD record and/or the end of the emulated (E)CKD record (e.g., the Padding Area 630 shown in FIG. 6).

In the illustrative example shown in FIG. 6, the emulated (E)CKD record 605 is mapped to three fixed-length blocks 640 (i.e., Block_1, Block_2, and Block_3). The mapping to three fixed-length blocks in this example is only for purposes of illustration. In general, an emulated (E)CKD record may be mapped to any number (preferably, a whole number) of fixed-length blocks.

Because only entire blocks can be read from or written to a fixed-block disk, the emulated (E)CKD records 605 are preferably mapped to fixed-length blocks 640 such that both the beginning and the end of the emulated (E)CKD record 605 are block-boundary aligned. The block-boundary alignment at the beginning of the emulated (E)CKD record 605 is shown in FIG. 6 by dotted line 642, while the block-boundary alignment at the end of the emulated (E)CKD record 605 is shown by dotted line 644. Thus, a fixed-length block 640 never contains data of two different (E)CKD records 605, such that the fixed-length blocks 640 of an individual emulated (E)CKD record 605 can always be read or written without affecting another emulated (E)CKD record's data.

Figure 7:
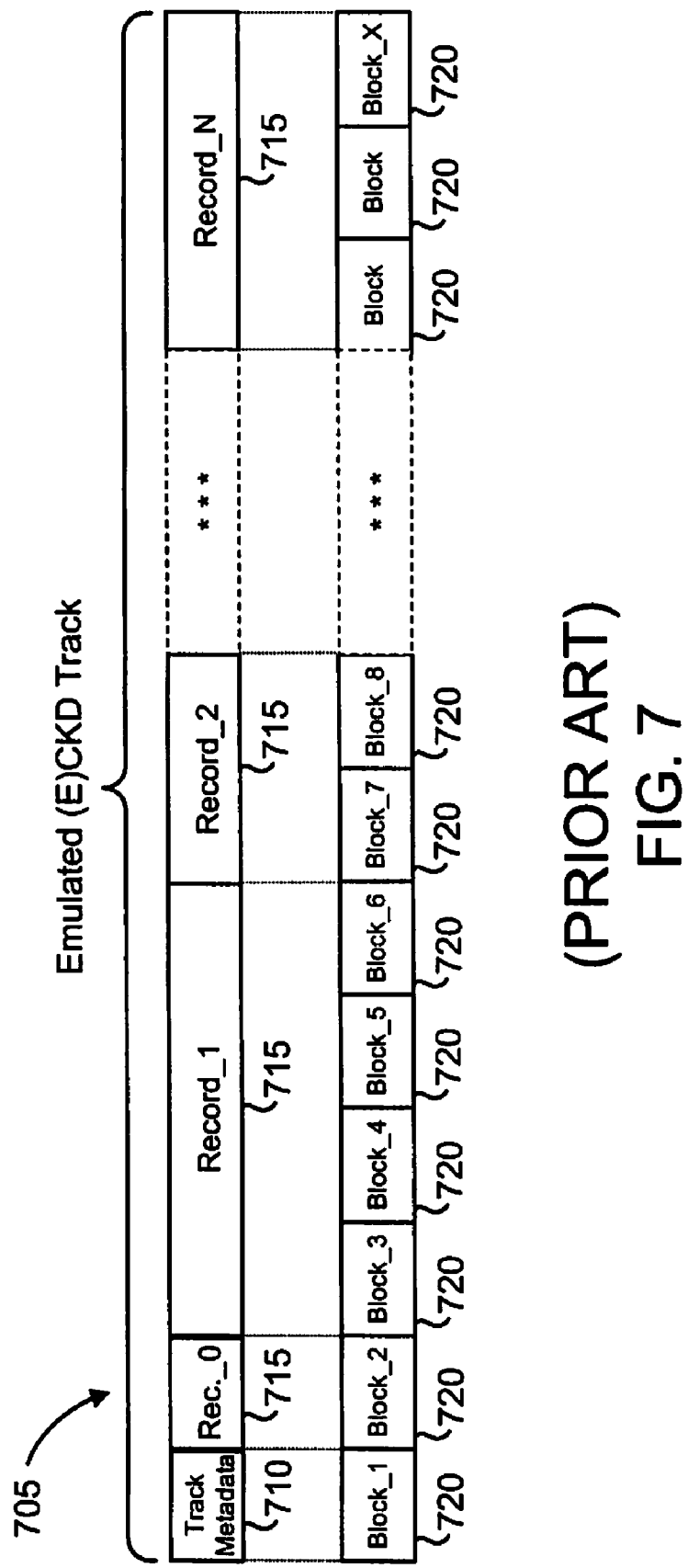
FIG. 7 is a schematic diagram illustrating an exemplary data structure's conventional organization of (E)CKD formatted data in the context of an emulated (E)CKD track mapped to a number of fixed-length blocks

Referring now to FIG. 7, which is a schematic diagram illustrating an exemplary data structure's conventional organization of (E)CKD formatted data in the context of an emulated (E)CKD track mapped to a number of fixed-length blocks, an emulated (E)CKD track 705 contains a Track Metadata field 710 and one or more of variable-length emulated (E)CKD records 715 (i.e., Record_0, Record_1, Record_2, ..., Record N).

At least one Track Metadata field, such as the Track Metadata field 710 shown in FIG. 7, is often present in an emulated (E)CKD track. However, this field may be omitted, or may be relocated with respect to the location of the Track Metadata field 710 shown in FIG. 7. Typically, an emulated (E)CKD track contains track metadata located at the beginning of the (E)CKD track (e.g., in the Track Metadata field 710 shown in FIG. 7) and/or the end of the emulated (E)CKD track. The track metadata contained in the Track Metadata field may include, for example, mapping information utilized by an emulation program. For example, this track metadata may include a description of the track layout and, more particularly, the starting block address and the length of each record of that track. Typically, the track metadata is used by the emulation program for performance reasons.

In the illustrative example shown in FIG. 7, the emulated (E)CKD track 705 is mapped to fixed-length blocks 720 (i.e., Block_1, Block_2, Block_3, ..., Block_X) such that both the beginning and the end of the emulated (E)CKD track 705 are block-boundary aligned. The mapping to X fixed-length blocks in this example is only for purposes of illustration. In general, an emulated (E)CKD track may be mapped to any number (preferably, a whole number) of fixed-length blocks.

Each of the variable-length emulated (E)CKD records 715 in the emulated (E)CKD track 705 shown in FIG. 7 corresponds with the variable-length emulated (E)CKD record 605 shown in FIG. 6. Each of these emulated (E)CKD records 715 is block-boundary aligned and is variable-length nature. For example, in the illustrative example shown in FIG. 7, the emulated (E)CKD records 715 have the following lengths: Record_0=one block, Record_1=four blocks, Record_2=two blocks, and Record_N=three blocks. Like the emulated (E)CKD records 715, the Track Metadata field 710 is block-boundary aligned.

Figure 8:
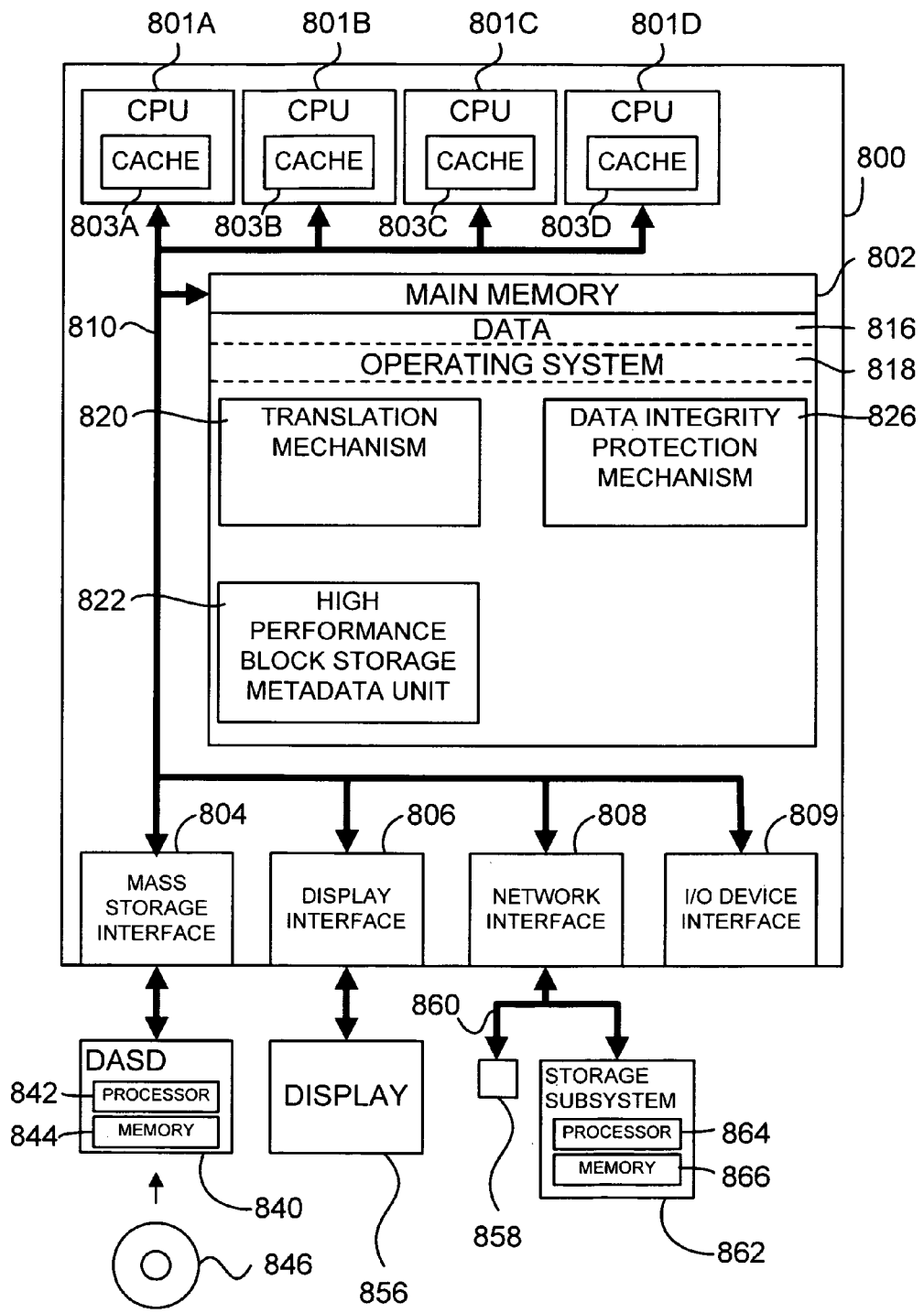
FIG. 8 is a schematic diagram of a computer apparatus for providing data protection for variable length records by utilizing high performance block storage metadata in accordance with the preferred embodiments of the present invention.

A computer system implementation of the preferred embodiments of the present invention will now be described with reference to FIG. 8 in the context of a particular computer system 800, i.e., a mainframe system such as an IBM eServer zSeries or System z mainframe system, or a server system such as an IBM eServer iSeries or System i computer system. However, those skilled in the art will appreciate that the method, apparatus, computer program product, and data structure of the present invention apply equally to any computer system, regardless of whether the computer system is a complicated multi-user computing apparatus, a single user workstation, a PC, a DASD (e.g., a hard disk drive), a storage subsystem or an embedded control system. As shown in FIG. 8, computer system 800 comprises one or more processors 801A, 801B, 801C and 801D, a main memory 802, a mass storage interface 804, a display interface 806, a network interface 808, and an I/O device interface 809. These system components are interconnected through the use of a system bus 810.

FIG. 8 is intended to depict the representative major components of computer system 800 at a high level, it being understood that individual components may have greater complexity than represented in FIG. 8, and that the number, type and configuration of such components may vary. For example, computer system 800 may contain a different number of processors than shown.

Processors 801A, 801B, 801C and 801D (also collectively referred to herein as "processors 801") process instructions and data from main memory 802. Processors 801 temporarily hold instructions and data in a cache structure for more rapid access. In the embodiment shown in FIG. 8, the cache structure comprises caches 803A, 803B, 803C and 803D (also collectively referred to herein as "caches 803") each associated with a respective one of processors 801A, 801B, 801C and 801D. For example, each of the caches 803 may include a separate internal level one instruction cache (L1 I-cache) and level one data cache (L1 D-cache), and level two cache (L2 cache) closely coupled to a respective one of processors 801. However, it should be understood that the cache structure may be different; that the number of levels and division of function in the cache may vary; and that the system might in fact have no cache at all.

Main memory 802 in accordance with the preferred embodiments contains data 816, an operating system 818 and application software, utilities and other types of software. In addition, in accordance with the preferred embodiments of the present invention, the main memory 802 (and/or other memory, as discussed below) also includes a translation mechanism 820, a high performance block storage metadata unit 822, and a data integrity protection mechanism 826, each of which may in various embodiments exist in any number. The translation mechanism 820 translates a variable length record (e.g., an (E)CKD record) into an emulated variable length record (e.g., an emulated (E)CKD record) that comprises a sequence of fixed-length blocks and incorporates high performance block storage metadata. Each of the fixed-length blocks includes a data block and a footer. The high performance block storage metadata unit 822 is created from a confluence of these footers. The data integrity protection mechanism 826 safeguards the integrity of the emulated variable length record (e.g., the emulated (E)CKD record) by checking a checksum contained in the high performance block storage metadata unit 822.

Although the translation mechanism 820, the high performance block storage metadata unit 822, and the data integrity protection mechanism 826 are illustrated in FIG. 8 as being contained within the main memory 802, in other embodiments some or all of them may be contained in other memory entities in the entire virtual memory of the computer system 800, memory of different electronic devices, and/or may be accessed remotely. For example, it is typically advantageous, for performance reasons and to save CPU cycles, to provide the translation mechanism 820, the high performance block storage metadata unit 822, and/or the data integrity protection mechanism 826 in a network interface 808 (e.g., a Host Bus Adapter (HBA) that is used on the host to connect to the Fibre Channel network—provided that a data transfer path between the host and the HBA can be considered "fully protected", which typically is the case for a mainframe system). Likewise, the translation mechanism 820, the high performance block storage metadata unit 822, and/or the data integrity protection mechanism 826 may be provided on a direct access storage device (e.g., direct access storage device 840), a storage subsystem (e.g., storage subsystem 862), and/or an intermediate device, such as a switch, in a data transfer path (e.g., a network 860) between the computer system 800 and a storage subsystem (e.g., storage subsystem 862).

In accordance with the preferred embodiments of the present invention, the translation mechanism 820 performs format translation from an (E)CKD record to an emulated (E)CKD record as further described below with reference to FIGS. 9-15. This function, i.e., format translation, may be performed for any number of (E)CKD records in one or more (E)CKD tracks (e.g., the tracks in a given cylinder). As described in more detail below, the high performance block storage metadata unit 822 is associated with an emulated (E)CKD record that is comprised of a sequence of fixed-length blocks. Each of the fixed-length blocks includes a data block and a footer. The high performance block storage metadata unit 822 is created from a confluence of these footers.

In accordance with the preferred embodiments of the present invention, the data integrity protection mechanism 826 utilizes the high performance block storage metadata unit 822 to safeguard the integrity of an emulated (E)CKD record as further described below with reference to FIGS. 14-17. For example, the data integrity protection mechanism may check a checksum contained in the high performance block storage metadata unit 822 and write a record integrity verification confirmation into the high performance block storage metadata unit 822 after performing the check. This function, i.e., data integrity protection, may be performed for any number of (E)CKD records in one or more (E)CKD tracks (e.g., the tracks in a given cylinder).

In the preferred embodiments of the present invention, the translation mechanism 820 and the data integrity protection mechanism 826 include instructions capable of executing on the processors 801 or statements capable of being interpreted by instructions executing on the processors 801 (and/or one or more other processors, as discussed below) to perform the functions as further described below with reference to FIGS. 14-16. In another embodiment, either the translation mechanism 820 or the data integrity protection mechanism 826, or both, may be implemented in hardware via logic gates and/or other appropriate hardware techniques in lieu of, or in addition to, a processor-based system.

As noted earlier, it is typically advantageous, for performance reasons and to save CPU cycles, to provide the translation mechanism 820 and/or the data integrity protection mechanism 826 in a network interface 808 (e.g., a Host Bus Adapter (HBA)) that is used on the host to connect to the Fibre Channel network—provided that a data transfer path between the host and the HBA can be considered "fully protected", which typically is the case for a mainframe system). Hence, the translation mechanism 820 and/or the data integrity protection mechanism 826 may include instructions capable of executing on one or more microprocessors of a Host Bus Adapter or statements capable of being interpreted by instructions executing on one or more microprocessors of a Host Bus Adapter.

Likewise, as noted earlier, the translation mechanism 820 and/or the data integrity protection mechanism 826 may be provided on a direct access storage device (e.g., direct access storage device 840), a storage subsystem (e.g., storage subsystem 862), and/or an intermediate device, such as a switch, in a data transfer path (e.g., a network 860) between the computer system 800 and a storage subsystem (e.g., storage subsystem 862). Hence, the translation mechanism 820 and/or the data integrity protection mechanism 826 may include instructions capable of executing on one or more microprocessors of such electronic devices or statements capable of being interpreted by instructions executing on one or more microprocessors of such electronic devices.

While the translation mechanism 820 and the data integrity protection mechanism 826 are shown separate and discrete from each other in FIG. 8, the preferred embodiments expressly extend to these mechanisms being implemented within a single component. In addition, either the translation mechanism 820 or the data integrity protection mechanism 826, or both, may be implemented in the operating system 818 or application software, utilities, or other types of software within the scope of the preferred embodiments.

Computer system 800 utilizes well known virtual addressing mechanisms that allow the programs of computer system 800 to behave as if they have access to a large, single storage entity instead of access to multiple, smaller storage entities such as main memory 802 and DASD device 840. Therefore, while data 816, operating system 818, the translation mechanism 820, the high performance block storage metadata unit 822, and the data integrity protection mechanism 826, are shown to reside in main memory 802, those skilled in the art will recognize that these items are not necessarily all completely contained in main memory 802 at the same time. It should also be noted that the term "memory" is used herein to generically refer to the entire virtual memory of the computer system 800.

Data 816 represents any data that serves as input to or output from any program in computer system 800. Operating system 818 is a multitasking operating system known in the industry as IBM z/OS, OS/400 or IBM i5/OS; however, those skilled in the art will appreciate that the spirit and scope of the present invention is not limited to any one operating system.

Processors 801 may be constructed from one or more microprocessors and/or integrated circuits. Processors 801 execute program instructions stored in main memory 802. Main memory 802 stores programs and data that may be accessed by processors 801. When computer system 800 starts up, processors 801 initially execute the program instructions that make up operating system 818. Operating system 818 is a sophisticated program that manages the resources of computer system 800. Some of these resources are processors 801, main memory 802, mass storage interface 804, display interface 806, network interface 808, I/O device interface 809 and system bus 810.

Although computer system 800 is shown to contain four processors and a single system bus, those skilled in the art will appreciate that the present invention may be practiced using a computer system that has a different number of processors and/or multiple buses. In addition, the interfaces that are used in the preferred embodiments each include separate, fully programmed microprocessors that are used to off-load compute-intensive processing from processors 801. For example, the network interface 808 may comprise a Host Bus Adapter (HBA) that includes one or more separate, fully programmed microprocessors that are used to off-load compute-intensive processing (e.g., processing related to the translation mechanism 820 and/or the data integrity protection mechanism 826) from processors 801. However, those skilled in the art will appreciate that the present invention applies equally to computer systems that simply use I/O adapters to perform similar functions.

Mass storage interface 804 is used to connect mass storage devices (such as a direct access storage device 840) to computer system 800. The direct access storage device (DASD) 840 may include a processor 842 and a memory 844. One specific type of direct access storage device 840 is hard disk drive (HDD). Another specific type of direct access storage device is a readable and writable CD ROM drive, which may store data to and read data from a CD ROM 846. In accordance with the preferred embodiments of the present invention, the data stored to and read from the DASD 840 (e.g., on the CD ROM 846, a hard disk, or other storage media) includes high performance block storage metadata. In the DASD 840, the footer of a fixed-size block will generally be written on the storage media together with the data block of the fixed-size block. This differs from the memory 802 of the computer system 800, where the footer of a fixed-size block is written in a separate physical area (i.e., the high performance block storage metadata unit 822) than where the data block of the fixed-size block is written.

In accordance with the preferred embodiments of the present invention, in lieu of, or in addition to, storing the translation mechanism 820 and the data integrity protection mechanism 826 on the main memory 802 of the computer system 800, the memory 844 of the DASD 840 may be used to store the translation mechanism 820 and/or the data integrity protection mechanism 826. Hence, in the preferred embodiments of the present invention, the translation mechanism 820 and the data integrity protection mechanism 826 include instructions capable of executing on the processor 842 of the DASD 840 or statements capable of being interpreted by instructions executing on the processor 842 of the DASD 840 to perform the functions as further described below with reference to FIGS. 14-16. For example, the DASD 840 may be an "intelligent" storage device that generates emulated (E)CKD records and verifies their integrity "autonomously" (without the need for a command from the computer system 800). In this regard, the DASD 840 may receive an (E)CKD record from the computer system 800 (via the system bus 810 and mass storage interface 804), and then "autonomously" generates an emulated (E)CKD record and checks the emulated (E)CKD record to verify its integrity before the emulated (E)CKD record is hardened on disk. If the integrity check fails, the DASD 840 may request the computer system 800 to retransmit the (E)CKD record.

An architecture in accordance with the preferred embodiments of the present invention allows a storage controller (e.g., the storage controller of the DASD 840) to act autonomously (from the computer or system that wrote the record) on the data according to instructions encoded in the metadata space (e.g., the space available for application metadata 1150, described below). For example, the space available for application metadata 1150 may include a subtype field that includes a "record integrity verification" value that instructs the storage controller to track integrity verification by writing a "verification status" value and a "date verification completed" value in the space available for application metadata 1150.

Display interface 806 is used to directly connect one or more displays 856 to computer system 800. These displays 856, which may be non-intelligent (i.e., dumb) terminals or fully programmable workstations, are used to allow system administrators and users (also referred to herein as "operators") to communicate with computer system 800. Note, however, that while display interface 806 is provided to support communication with one or more displays 856, computer system 800 does not necessarily require a display 856, because all needed interaction with users and processes may occur via network interface 808.

Network interface 808 is used to connect other computer systems and/or workstations 858 and/or storage subsystems 862 to computer system 800 across a network 860. The present invention applies equally no matter how computer system 800 may be connected to other computer systems and/or workstations and/or storage subsystems, regardless of whether the network connection 860 is made using present-day analog and/or digital techniques or via some networking mechanism of the future. In addition, many different network protocols can be used to implement a network. These protocols are specialized computer programs that allow computers to communicate across network 860. TCP/IP (Transmission Control Protocol/Internet Protocol) is an example of a suitable network protocol.

The storage subsystem 862 may include a processor 864 and a memory 866, similar to the processor 842 and the memory 844 in the DASD 840. In accordance with the preferred embodiments of the present invention, the data stored to and read from the storage system 862 (e.g., from hard disk drives, tape drives, or other storage media) includes high performance block storage metadata. In the storage system 862, as in the DASD 840, the footer of a fixed-size block will generally be written on the storage media together with the data block of the fixed size block. This differs from the memory 802 of the computer system 800, where the footer of a fixed-size block is written in a separate physical area (i.e., the high performance block storage metadata unit 822) than where the data block of the fixed-size block is written.

In accordance with the preferred embodiments of the present invention, in lieu of, or in addition to, storing the translation mechanism 820 and the data integrity protection mechanism 826 on the main memory 802 of the computer system 800, the memory 866 of the storage subsystem 862 may be used to store the translation mechanism 820 and/or the data integrity protection mechanism 826. Hence, in the preferred embodiments of the present invention, the mechanisms 820 and 826 include instructions capable of executing on the processor 864 of the storage subsystem 862 or statements capable of being interpreted by instructions executing on the processor 864 of the storage subsystem 862 to perform the functions as further described below with reference to FIGS. 14-16. For example, the storage subsystem 862 may be an "intelligent" external storage subsystem that receives emulated (E)CKD records from the computer system 800 and verifies their integrity "autonomously" (without the need for a command from the computer system 800). In this regard, the storage subsystem 862 may receive an emulated (E)CKD record from the computer system 800 (e.g., the emulated (E)CKD record may be generated in a Host Bus Adapter (HBA) of the network interface 808 and transmitted over the network 860), and then the storage subsystem 862 "autonomously" checks the emulated (E)CKD record to verify its integrity before the emulated (E)CKD record is hardened on disk. If the integrity check fails, the storage subsystem 862 may request the computer system 800 to retransmit the emulated (E)CKD record.

An architecture in accordance with the preferred embodiments of the present invention allows a storage controller (e.g., the storage controller of the storage subsystem 862) to act autonomously (from the computer or system that wrote the record) on the data according to instructions encoded in the metadata space (e.g., the space available for application metadata 1150, described below). For example, the space available for application metadata 1150 may include a subtype field that includes a "record integrity verification" value that instructs the storage controller to track integrity verification by writing a "verification status" value and a "date verification completed" value in the space available for application metadata 1150.

The I/O device interface 809 provides an interface to any of various input/output devices.

At this point, it is important to note that while this embodiment of the present invention has been and will be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks and CD ROMs (e.g., CD ROM 846 of FIG. 8), and transmission type media such as digital and analog communications links (e.g., network 860 in FIG. 8).

Figure 9:
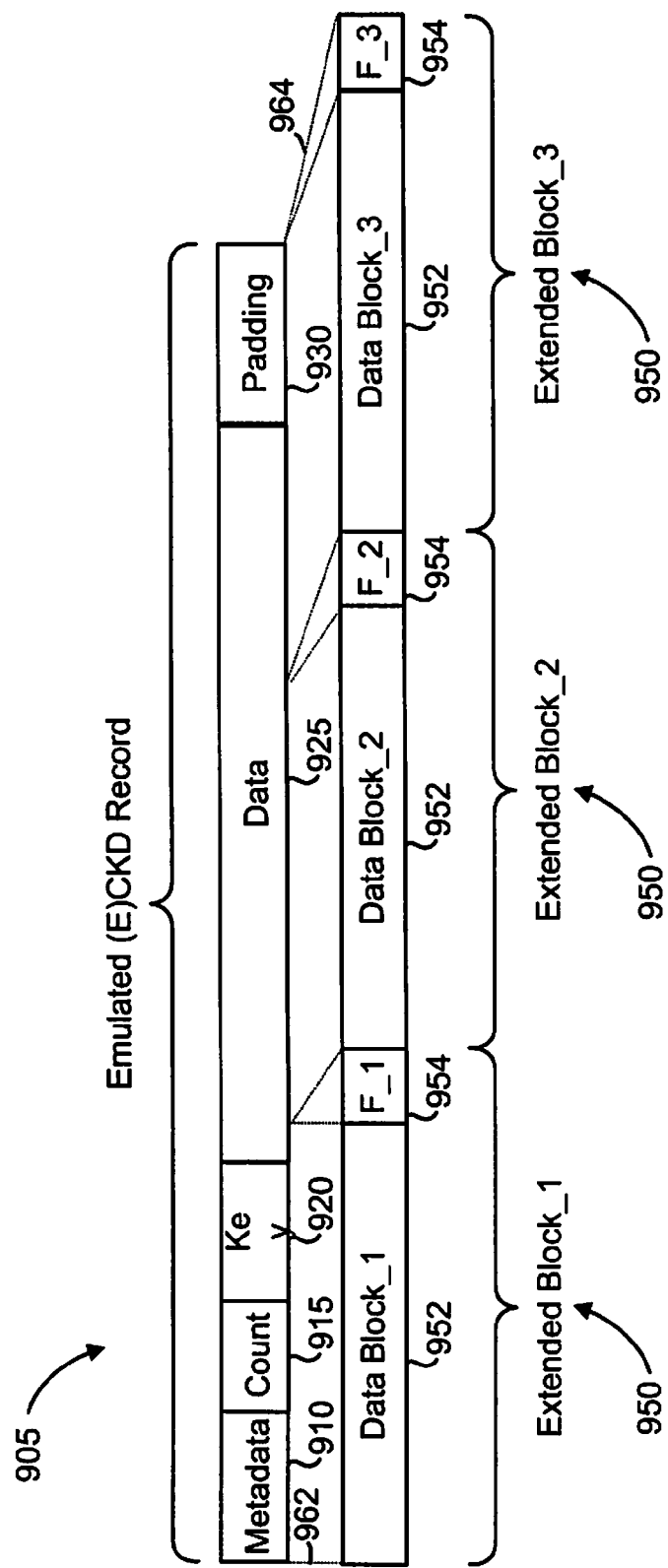
FIG. 9 is a schematic diagram illustrating an example data structure for an emulated (E)CKD record mapped to a number of extended fixed-length blocks containing high performance block storage metadata in accordance with the preferred embodiments of the present invention.

FIG. 9 is a schematic diagram illustrating an example data structure for an emulated (E)CKD record 905 mapped to a number of fixed-length blocks containing high performance block storage metadata in accordance with the preferred embodiments of the present invention. The data structure shown in FIG. 9 is similar to the conventional data structure shown in FIG. 6 except that the fixed-length blocks 640 in FIG. 6 are replaced in FIG. 9 by extended fixed-length blocks 950 in accordance with the preferred embodiments of the present invention. Each of the extended fixed-length blocks 950 has a fixed-length block 952 (also referred to herein as a "data block") and a fixed-length footer 954. As discussed in more detail below with reference to FIGS. 10 and 11, a confluence of the footers 954 defines a high performance block storage metadata unit associated with the emulated (E)CKD record 905 in accordance with the preferred embodiments of the present invention.

The emulated (E)CKD record 905 contains a Metadata field 910, a Count field 915, an optional Key field 920, a Data field 925, and a Padding Area 930. These fields respectively generally correspond to the Record Metadata field 610, Count field 615, optional Key field 620, Data field 625, Padding Area 630 of the emulated (E)CKD record shown in FIG. 6. However, rather than being mapped to a number of fixed-length blocks 640 as is the emulated (E)CKD record 605 in FIG. 6, in accordance with the preferred embodiments of the present invention the emulated (E)CKD record 905 is mapped to a number of extended fixed-length blocks 950.

At least one Metadata field, such as the Metadata field 910 shown in FIG. 9, is often present in an emulated (E)CKD record. However, this field may be omitted, or may be relocated with respect to the location of the Metadata field 910 shown in FIG. 9. Typically, an emulated (E)CKD record contains record metadata located at the beginning of the (E)CKD record (e.g., in the Metadata field 910 shown in FIG. 9) and/or the end of the emulated (E)CKD record. The Metadata field contains metadata that may include, for example, mapping information utilized by an emulation program.

The Count field 915, the optional Key field 920 and the Data field 925 of the emulated (E)CKD record 905 shown in FIG. 9 respectively correspond to the Count field 510, the optional Key field 515, and the Data field 520 of the (E)CKD record 505 shown in FIG. 5.

At least one padding area, such as the Padding Area 930 shown in FIG. 9, is often present in an emulated (E)CKD record. However, the padding area may be omitted, or may be relocated with respect to the location of the Padding Area 930 shown in FIG. 9. Typically, an emulated (E)CKD contains a padding area to achieve block boundary alignment, as discussed below. If present, the padding area is located at the beginning of the (E)CKD record and/or the end of the emulated (E)CKD record (e.g., the Padding Area 930 shown in FIG. 9).

In the illustrative example shown in FIG. 9, the emulated (E)CKD record 905 is mapped to three extended fixed-length blocks 950 (i.e., Extended Block_1, Extended Block_2, and Extended Block_3). The mapping to three extended fixed-length blocks in this example is only for purposes of illustration. In general, an emulated (E)CKD record may be mapped to any number (preferably, a whole number) of extended fixed-length blocks.

As mentioned above, each of the extended fixed-length blocks 950 of the emulated (E)CKD record 905 includes a data block 952 and a footer 954. For example, an Extended Block_1 of the emulated (E)CKD record 905 includes a Data Block_1 and a Footer_1. Likewise, an Extended Block_2 of the emulated (E)CKD record 905 includes a Data Block_2 and a Footer_2. Also, an Extended Block_3 of the emulated (E)CKD record 905 includes a Data Block_3 and a Footer_3. The Data Block_1, the Data Block_2, and the Data Block_3 of the emulated (E)CKD record 905 respectively correspond to the Block_1, the Block_2, and the Block_3 of the emulated (E)CKD record 605 shown in FIG. 6.

Because only entire blocks can be read from or written to a fixed-block disk, the emulated (E)CKD records 905 are preferably mapped to extended fixed-length blocks 950 such that both the beginning and the end of the emulated (E)CKD record 905 are block-boundary aligned. The block-boundary alignment at the beginning of the emulated (E)CKD record 905 is shown in FIG. 9 by dotted line 962, while the block-boundary alignment at the end of the emulated (E)CKD record 905 is shown by dotted line 964. Thus, an extended fixed-length block 950 never contains data of two different (E)CKD records 905, such that the extended fixed-length blocks 950 of an individual emulated (E)CKD record 905 can always be read or written without affecting another emulated (E)CKD record's data.

Figure 10:
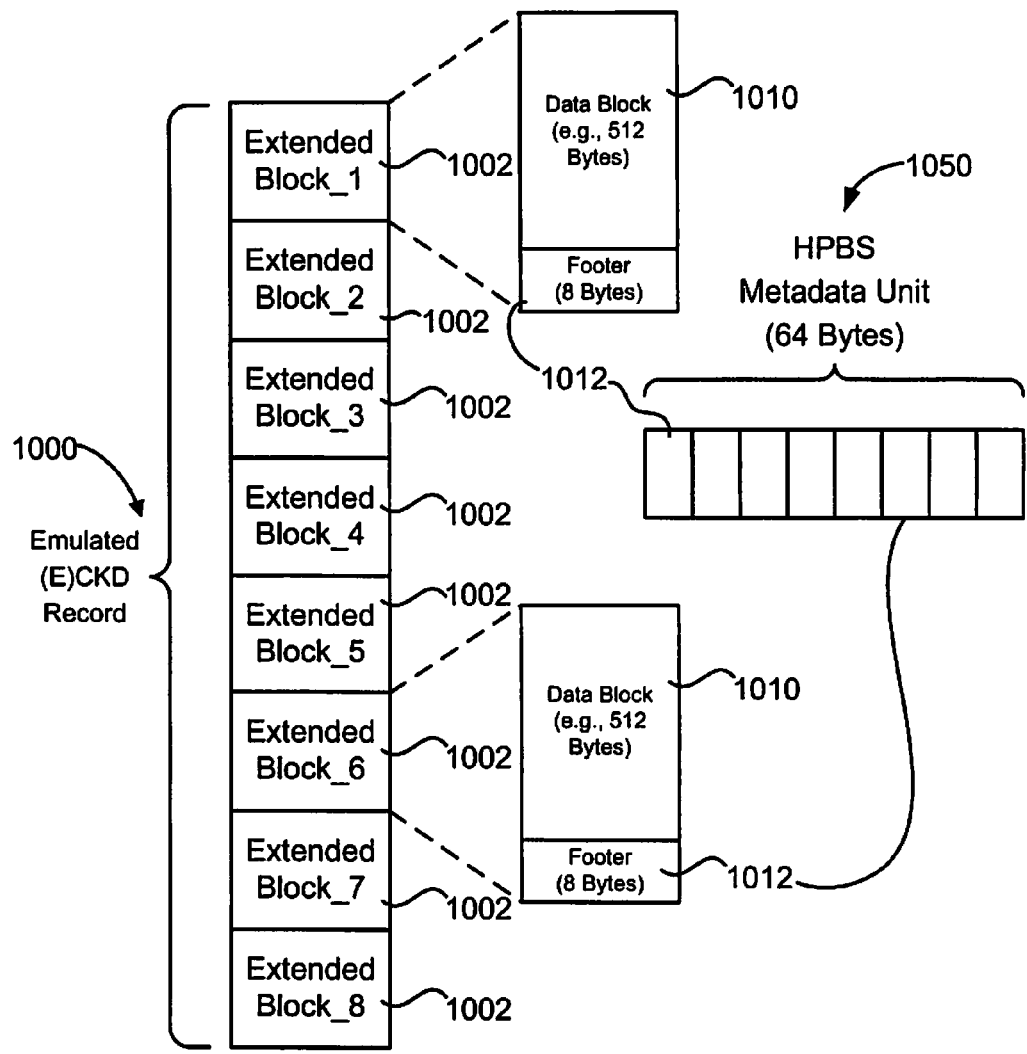
FIG. 10 is a schematic diagram illustrating an example data structure for an emulated (E)CKD record comprising a sequence of extended fixed-size blocks containing high performance block storage metadata in accordance with the preferred embodiments of the present invention.

FIG. 10 is a schematic diagram illustrating an example data structure for an emulated (E)CKD record 1000 comprising a sequence of extended fixed-length blocks 1002 containing high performance block storage metadata in accordance with the preferred embodiments of the present invention. Generally, the entire emulated (E)CKD record 1000 is read/written together in one operation. Although the length of the emulated (E)CKD record 1000 shown in FIG. 10 is eight extended blocks (i.e., eight extended fixed-length blocks 1002), one skilled in the art will appreciate that an emulated (E)CKD record or, more generally, any emulated variable length record in accordance with the preferred embodiments of the present invention may have any suitable length. Preferably, the length of the emulated (E)CKD record is between 1 to 94 extended fixed-length blocks. Each extended fixed-length block 1002 includes a fixed-length data block 1010 (e.g., 512-bytes) and a fixed-length footer 1012 (e.g., 8-bytes). Only the data block 1010 and the footer 1012 of the first and the sixth extended fixed-size blocks 1002 are shown in FIG. 10. Preferably, each of the data blocks 1010 is 512-bytes and each of the footers 1012 is 8-bytes. However, one skilled in the art will appreciate that the data blocks and the footers in accordance with the preferred embodiments of the present invention may have any suitable size.

As shown in FIG. 10, in accordance with the preferred embodiments of the present invention, a high performance block storage (HPBS) metadata unit 1050 is created from a confluence of the footers 1012. The HPBS metadata unit 1050 in FIG. 10 corresponds with the high performance block storage metadata unit 822 in FIG. 8. While the exemplary HPBS metadata unit 1050 shown in FIG. 10 is 64-bytes (i.e., 8 footers×8-bytes/footer), one skilled in the art will appreciate that an HPBS metadata unit in accordance with the preferred embodiments is not limited to 64-bytes (i.e., the size of the HPBS metadata unit is the product of the number of extended fixed-length blocks/emulated (E)CKD record and the length of the footer within each of the extended fixed-size blocks). The sequential order of the footers in the emulated (E)CKD record 1000 is retained in the confluence of footers that make up the HPBS metadata unit 1050. For example, as shown in FIG. 10, the footers 1012 of the first and sixth extended fixed-length blocks 1002 in the emulated (E)CKD record 1000 respectively occupy the first and sixth "slots" in the confluence of footers that define the HPBS metadata unit 1050.

Figure 11:
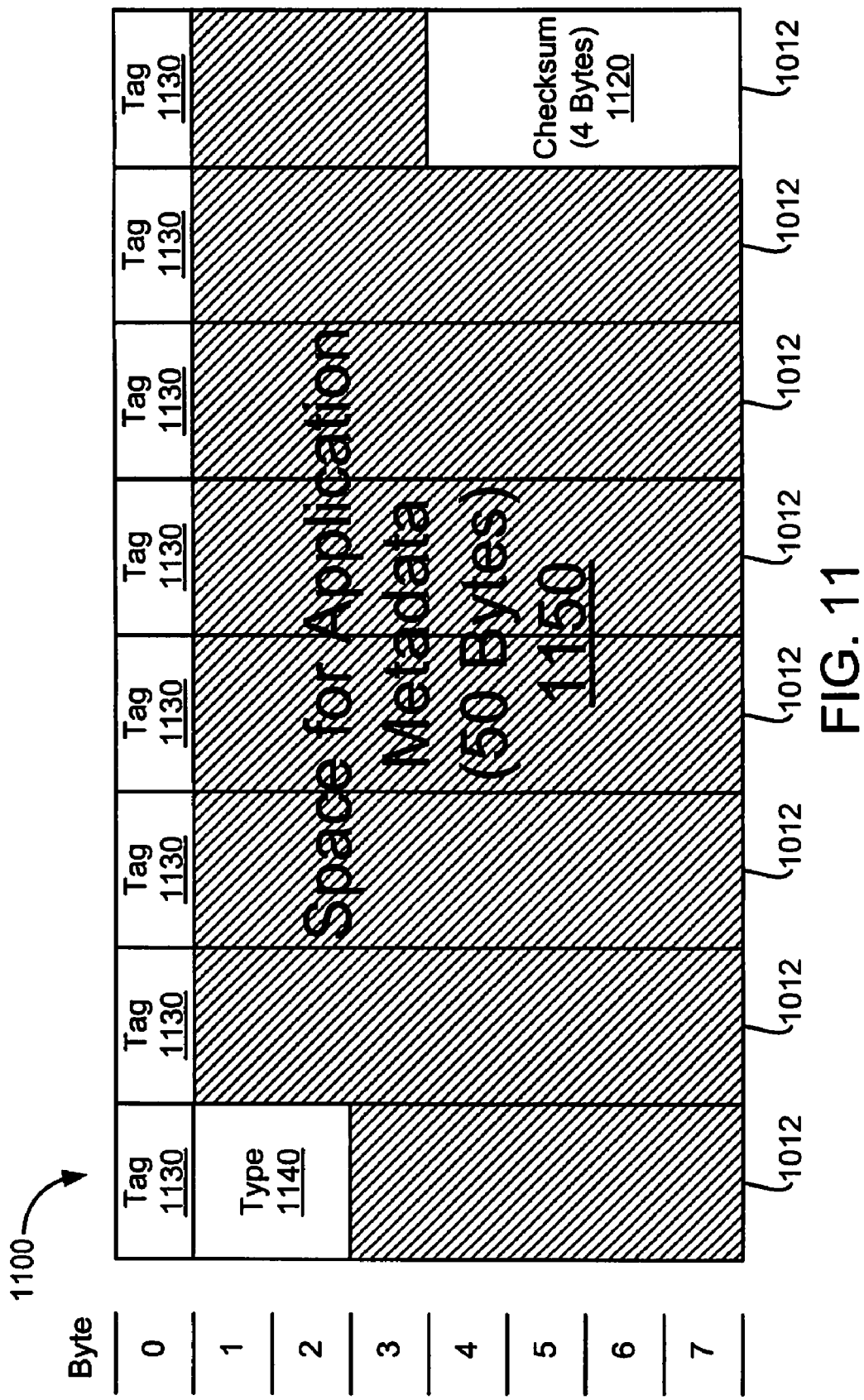
FIG. 11 is a schematic diagram illustrating an example data structure for a confluence of footers for providing high performance block storage metadata in accordance with the preferred embodiments of the present invention.

FIG. 11 is a schematic diagram illustrating an example data structure 1100 for a confluence of footers for providing high performance block storage metadata in accordance with the preferred embodiments of the present invention. One skilled in the art will appreciate, however, that alternative data structures may be used in accordance with the preferred embodiments of the present invention.

A checksum is contained in a Checksum field (i.e., a Checksum field 1120, discussed below) in the data structure 1100 shown in FIG. 11. It is important to note that as utilized herein, including in the claims, the term "checksum" is intended to encompass any type of hash function, including a cyclic redundancy code (CRC).

A four-byte Checksum field 1120 preferably covers all the data blocks 1010 (shown in FIG. 10) and all the footers 1012 within the emulated (E)CKD record 1000. Preferably, the Checksum field 1120 occupies bytes 4-7 in the last footer 1012 of the HPBS metadata unit 1100. As noted above, the Checksum field 1120 contains a checksum that is calculated using any suitable hash function, including a CRC. In addition, a Tag field 1130 is included in each footer 1012 of the HPBS metadata unit 1100. The Tag field 1130, which is described below with reference to FIG. 12, preferably is one byte and occupies byte-0 in each footer 1012 of the HPBS metadata unit 1100. Also, a Type field 1140 is included in at least one of the footers 1012 of the HPBS metadata unit 1100. The Type field 1140 specifies a metadata type number, which defines application metadata 1150. For example, each software and/or hardware company may have its own metadata type number. Allocation of the metadata type numbers may be administered, for example, by an appropriate standards body. Preferably, the Type field 1140 is two bytes and occupies byte-1 and byte-2 in the first footer 1012 of the HPBS metadata unit 1100. The HPBS metadata unit 1100, therefore, has 50 bytes of space available (shown as a hatched area in FIG. 11) for application metadata 1150.

Figure 1:
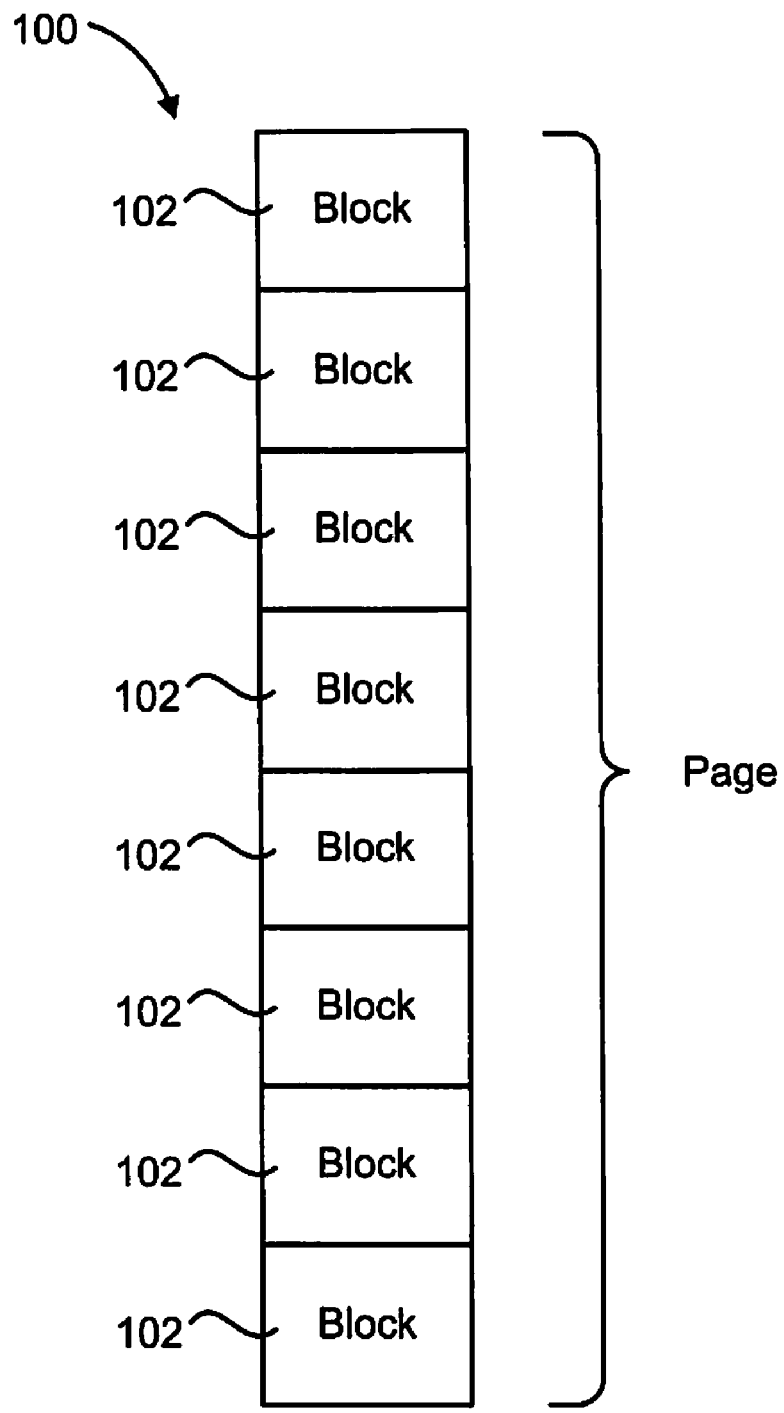
FIG. 1 is a schematic diagram illustrating an example data structure for a conventional sequence of fixed-size blocks that together define a page.
Figure 2:
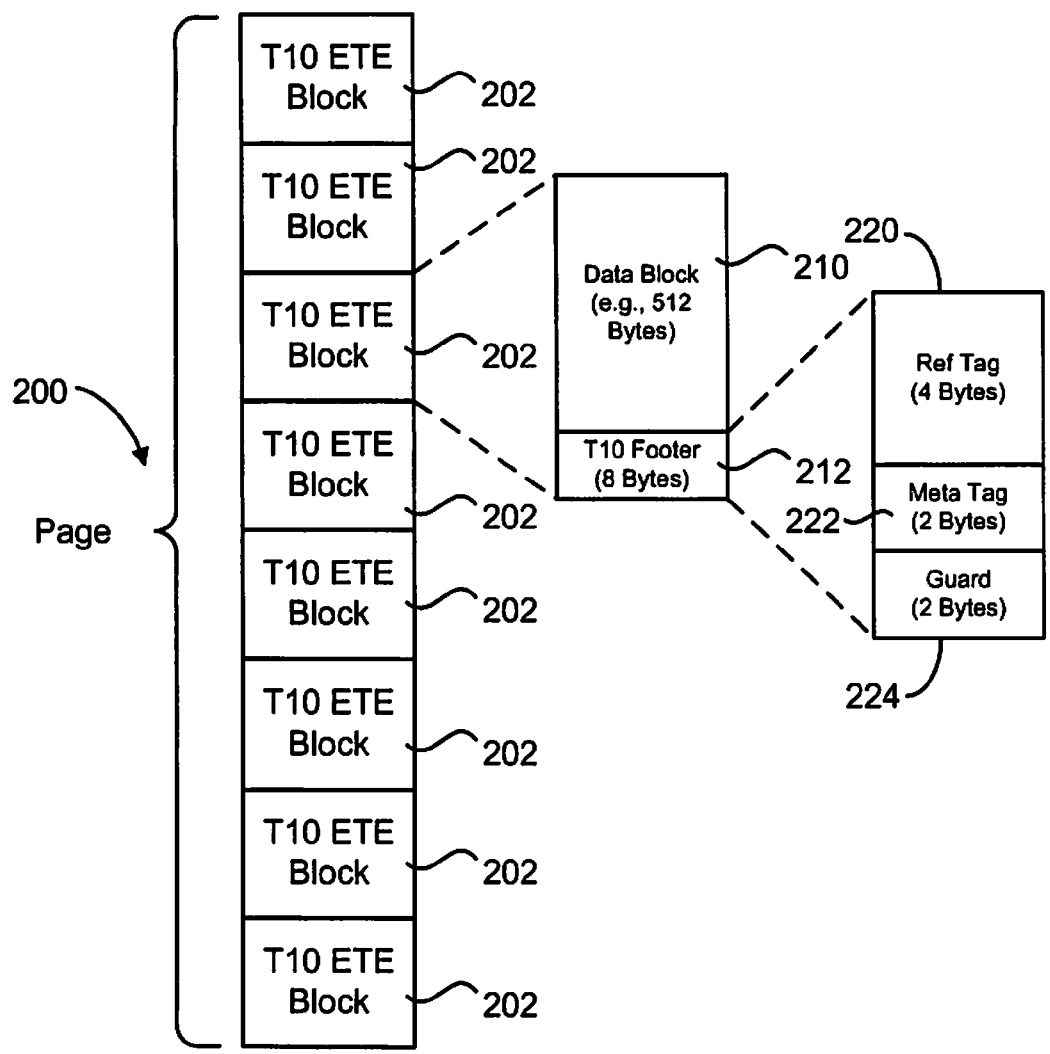
FIG. 2 is a schematic diagram illustrating an example data structure for a conventional sequence (i.e., page) of fixed-size blocks in accordance with the current T10 End-to-End (ETE) Data Protection architecture.

As noted above, one skilled in the art will appreciate that alternative data structures to the example data structure 1100 shown in FIG. 11 may be used in accordance with the preferred embodiments of the present invention. For example, a checksum covering just the footers 1012 may be utilized in lieu of the checksum 1120, which covers both the data blocks 1010 and the footers 1012. Such an alternative data structure may, for example, cover the data blocks 1010 by utilizing the T10 CRC, i.e., each footer in the confluence of footers that makes up the HPBS metadata unit includes a two-byte T10 CRC field. This two-byte T10 CRC field may, for example, contain the same contents as the Guard field 224 (shown in FIG. 2), which was discussed above with reference to the current T10 ETE Data Protection architecture. Such an alternative data structure is disclosed in U.S. Ser. No. 11/871,532, filed Oct. 12, 2007, entitled "METHOD, APPARATUS, COMPUTER PROGRAM PRODUCT, AND DATA STRUCTURE FOR PROVIDING AND UTILIZING HIGH PERFORMANCE BLOCK STORAGE METADATA", which is assigned to the assignee of the instant application and which is hereby incorporated herein by reference in its entirety.

Figure 12:
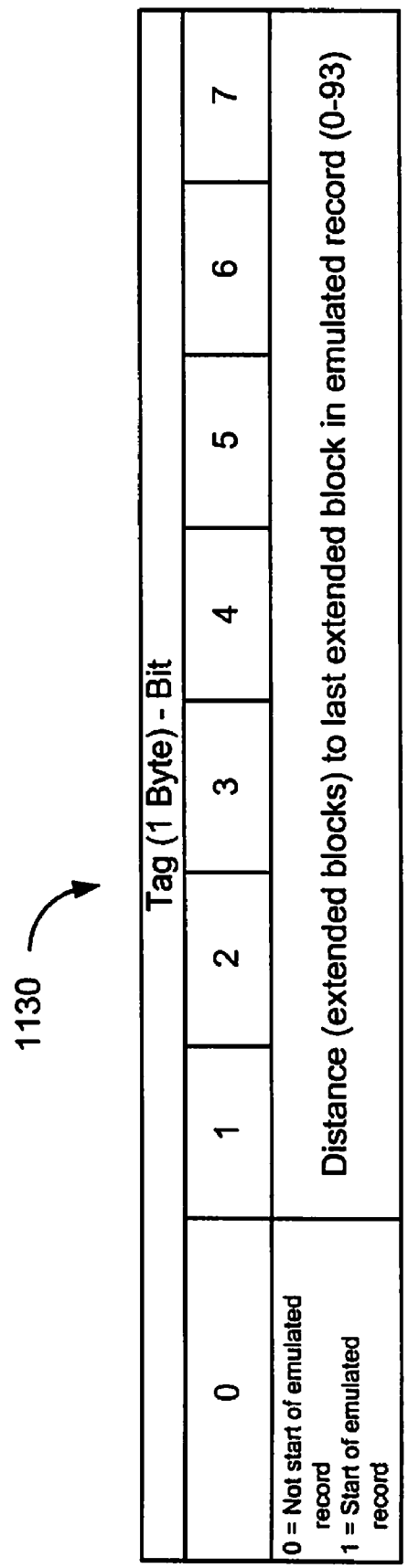
FIG. 12 is a schematic diagram illustrating an example data structure for a Tag field in accordance with the preferred embodiments of the present invention.

FIG. 12 is a schematic diagram illustrating an example data structure for a Tag field, such as Tag field 1130 (shown in FIG. 11), in accordance with the preferred embodiments of the present invention. As mentioned above, the Tag field 1130 is preferably one byte. In accordance with the preferred embodiments of the present invention, bit0 of the Tag field 1130 contains a value that indicates whether or not the Tag field 1130 is associated with the first extended fixed-size block of the emulated (E)CKD record. For example, if bit0 of the Tag field 1130 contains a "zero" value then the Tag field 1130 is not the start of the emulated (E)CKD record, or if bit0 of the Tag field 1130 contains a "one" value then the Tag field 1130 is the start of the emulated (E)CKD record. Also, in accordance with the preferred embodiments of the present invention, bit1 through bit7 of the Tag field 1130 contains a value that indicates the distance (expressed in extended fixed-length blocks) to the last extended fixed-length block in the emulated (E)CKD record. Because the emulated (E)CKD record preferably contains anywhere from 1 to 94 extended fixed-size blocks, bit1 through bit7 of the Tag field 1130 will contain a value ranging from 0 to 93.

Figure 13:
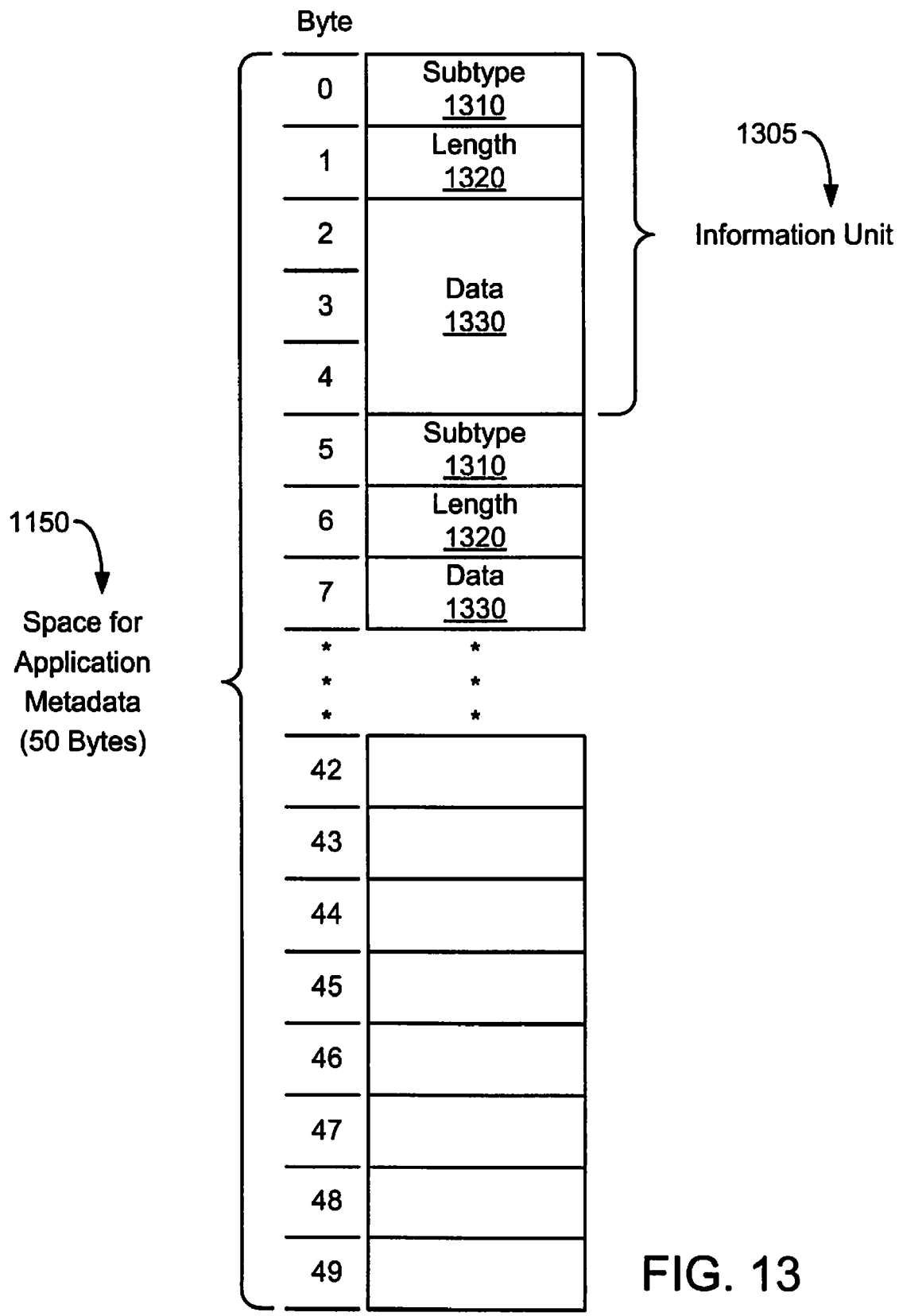
FIG. 13 is a schematic diagram illustrating an example data structure for application metadata containing a plurality of information units in accordance with the preferred embodiments of the present invention.

FIG. 13 is a schematic diagram illustrating an example data structure for application metadata, such as the application metadata 1150 (shown in FIG. 11), containing one or more information units in accordance with the preferred embodiments of the present invention. At fifty bytes, the space available for application metadata 1150 shown in FIG. 13 corresponds to the space available shown in FIG. 11. The data structure of the application metadata contained in the space 1150 includes a series of one or more contiguous variable-sized Information Units (IUs) 1305. Each IU 1305 is of variable size and consists of a subtype field 1310 (1 byte), a length of data field 1320 (1 byte), and a data field 1330 (0 to "n" bytes). Preferably, the subtypes values contained in the subtype field 1310 are specific to the type value contained in the type field 1140 (shown in FIG. 11) so that the same subtype value may have different meanings for different type values. For example, the type value may designate a software and/or hardware vendor, and the subtype value may designate one or more platforms of the software and/or hardware vendor. This data structure provides a very flexible architecture for organizing a series of IUs associated with the page.

Figure 14:
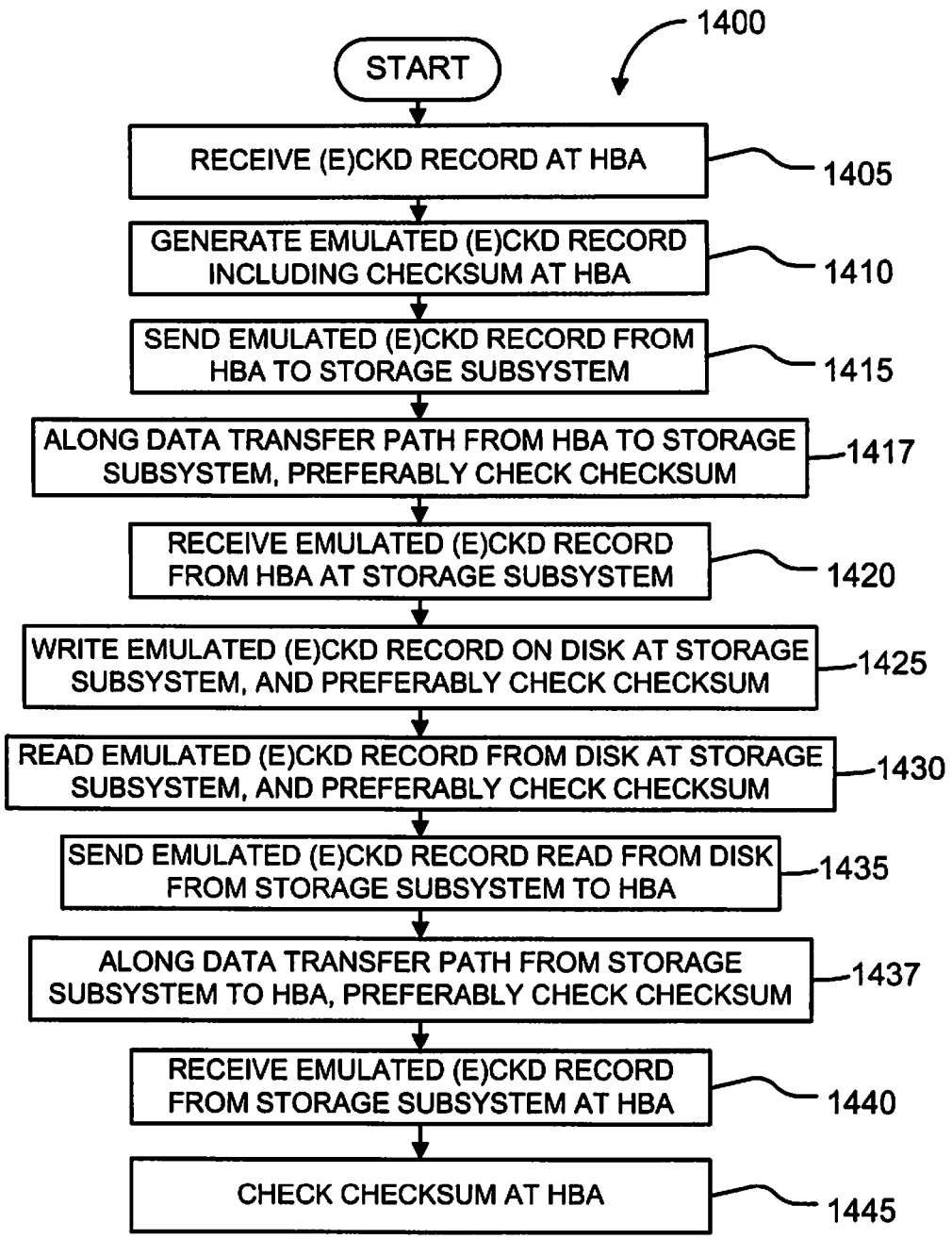
FIG. 14 is a flow diagram illustrating a method for utilizing high performance block storage metadata to provide data protection for a variable length record in accordance with the preferred embodiments of the present invention.

FIG. 14 is a flow diagram illustrating a method 1400 for utilizing high performance block storage metadata to provide data protection for a variable length record in accordance with the preferred embodiments of the present invention. In the method 1400, the steps discussed below (steps 1405-1445) are performed. These steps are set forth in their preferred order. It must be understood, however, that the various steps may occur at different times relative to one another than shown, or may occur simultaneously. Moreover, those skilled in the art will appreciate that one or more of the steps may be omitted.

In accordance with the preferred embodiments of the present invention, the method 1400 distinguishes between two types of I/O operations during the various record-level footer generation and checksum checking steps discussed below (e.g., steps 1410, 1417, 1425, 1430, 1437, and/or 1445). The first type of I/O operation is a read or a write of an entire track. This first type of I/O operation may be, for example, associated with a read or a write involving an ECKD track. With ECKD, the physical track is the smallest unit that can be read or written. The second type of I/O operation is a read or a write of one or more records which represent less than an entire track. This second type of I/O operation may be, for example, associated with a read or a write involving one or more CKD records.

To generate the footers for outbound data transfer in the emulated record generation step discussed below (e.g., step 1410), when a host computer system passes to a Host Bus Adapter (HBA) the data to be sent, the host computer system also specifies the number of records included in the data, as well as the beginning and the end of each record. This enables the HBA to generate the contents of the Tag fields (e.g., the Tag fields 1130 shown in FIGS. 11 and 12) and the Checksum field (e.g., the Checksum field 1120 shown in FIG. 11) in the confluence of footers that tie the individual records together. This information specified by the host computer system is referred to herein as "multi-record" metadata. The multi-record metadata relate to a plurality of records up to, and including, all of the records in an entire track, for example. In accordance with the preferred embodiments of the present invention, in the emulated record generation step discussed below (step 1410), the translation mechanism incorporates the multi-record metadata in a Metadata field (e.g., the Metadata field 910 shown in FIG. 9) of the first emulated record. Hence, the Metadata field of the first emulated record preferably contains multi-record metadata in lieu of, or in addition to, the usual record metadata. The multi-record metadata in the Metadata field may be used by the HBA, for example, to re-assemble the records into a track (or partial track) once the individual records have been reverse-translated by the HBA. For example, the HBA may reverse-translate individual emulated (E)CKD records back into individual (E)CKD records, then re-assemble the individual (E)CKD records into an (E)CKD track (or partial track), and then send the re-assembled (E)CKD track (or partial track) to the host computer system.

In the various checksum checking steps discussed below (e.g., steps 1417, 1425, 1430, 1437, and/or 1445), the checksum is checked for each emulated record based on the knowledge about the emulated record that can be derived from the footers themselves. For example, each of the Tag fields 1130 (shown in FIGS. 11 and 12) in the confluence of footers 1100 (shown in FIG. 11) associated with an emulated record contains a value that indicates whether or not the Tag field 1130 is associated with the first extended fixed-size block of the emulated (E)CKD record, as well as a value that indicates the distance (expressed in extended fixed-length blocks) to the last extended fixed-length block in the emulated (E)CKD record. The checksum to be checked is contained in the Checksum field 1120 (shown in FIG. 11) of the last extended fixed-block in the emulated (E)CKD record.

The method 1400 begins when the HBA of the host computer system receives a variable length record (step 1405). The variable length record may be, for example, either a Count-Key-Data (CKD) record or an Extended-Count-Key-Data (ECKD) record. One skilled in the art will appreciate, however, that other types of variable length records may be utilized in accordance with the preferred embodiments of the present invention.

The method 1400 continues with the generation of an emulated (E)CKD record by a translation mechanism in the HBA (step 1410). In accordance with the preferred embodiments of the present invention, the emulated (E)CKD record generated by the translation mechanism in step 1410 emulates the (E)CKD record received in step 1405 and comprises a sequence of fixed-length blocks (e.g., the Extended Blocks 1002 shown in FIG. 10). Each of the fixed length blocks comprises a data block and a footer (e.g., the Data Block 1010 and the Footer 1012 shown in FIG. 10). A confluence of the footers defines a high performance block storage metadata unit (e.g., the HPBS Metadata Unit 1050 shown in FIG. 10) that is associated with the emulated (E)CKD record. The high performance metadata unit includes a Checksum field (e.g., the Checksum field 1120 shown in FIG. 11) containing a checksum that covers all of the data blocks and all of the footers within the entirety of the emulated (E)CKD record.

Figure 15:
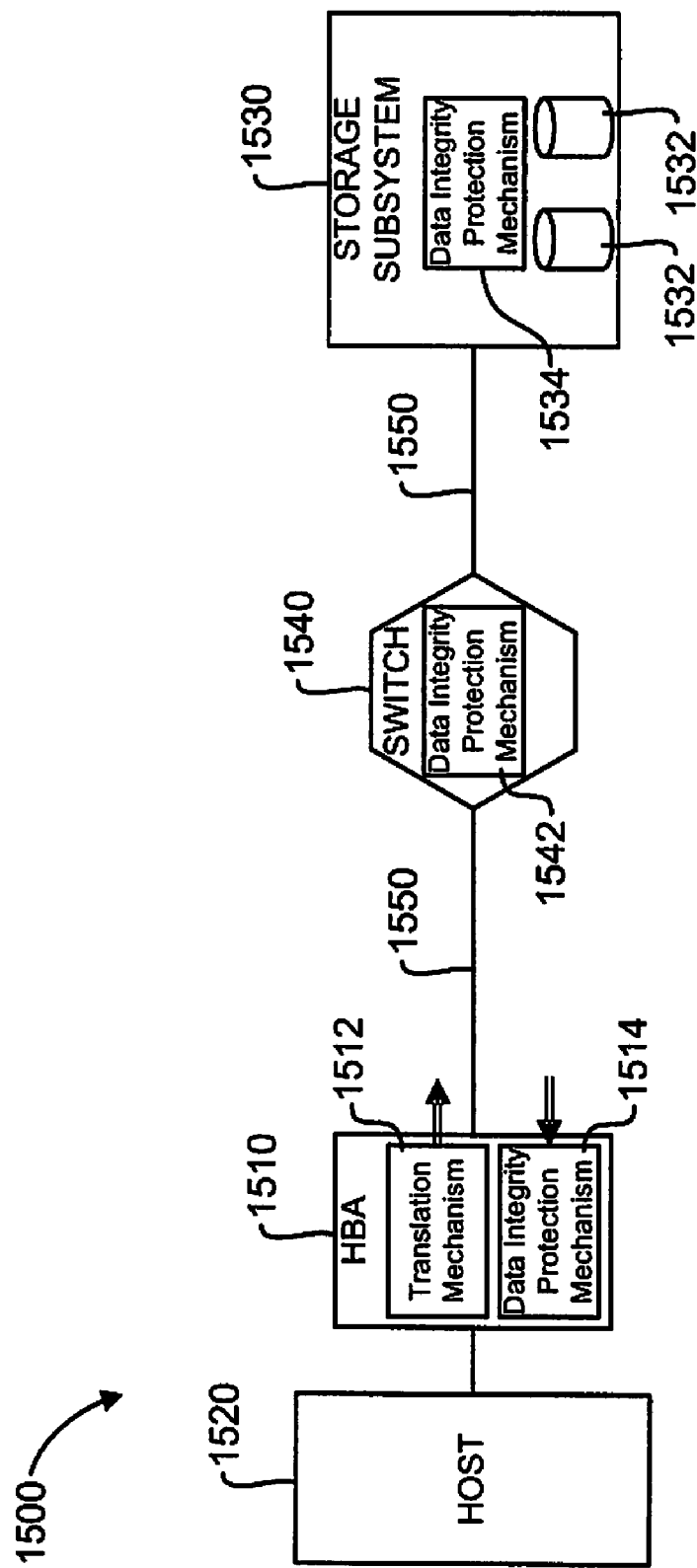
FIG. 15 is a schematic diagram of a data processing system for providing data protection for variable length records utilizing high performance block storage metadata in accordance with the preferred embodiments of the present invention

Referring temporarily to FIG. 15, which is a schematic diagram of a data processing system 1500 for providing data protection for variable length records utilizing high performance block storage metadata in accordance with the preferred embodiments of the present invention, a HBA 1510 receives an (E)CKD record from a host computer system 1520 (step 1405 in FIG. 14). A translation mechanism 1512 of the HBA 1510 then generates an emulated (E)CKD record (step 1410 in FIG. 14) based on the received (E)CKD record.

The translation mechanism 1512 shown in FIG. 15 generally corresponds in function with the translation mechanism 820 shown in FIG. 8. In this illustrative example, the translation mechanism 1512 generates the emulated (E)CKD record in the HBA 1510. One skilled in the art will appreciate, however, that the generation of the emulated (E)CKD may take place in one or more electronic devices other than an HBA in accordance with the preferred embodiments of the present invention. In such an alternative example, an (E)CKD record may be received by a storage subsystem, which is provided with a translation mechanism for generating the emulated (E)CKD record within the storage subsystem. In this alternative example, steps corresponding to steps 1405 and 1410 in FIG. 14 would occur in the storage subsystem rather than in the HBA.

Referring back to FIG. 14, the method 1400 continues with the emulated (E)CKD record being sent to a storage subsystem (step 1415). For example, referring temporarily again to FIG. 15, the emulated (E)CKD record is sent from the HBA 1510 along a data transfer path 1550 to a storage subsystem 1530. The storage subsystem 1530 includes one or more disk drives 1532. Preferably, the storage subsystem 1530 also includes a data integrity protection mechanism 1534, which as discussed below, may be used to safeguard data integrity when the emulated (E)CKD record is written to disk and/or read from disk.

Referring back to FIG. 14, the method 1400 may continue with an optional step along the data transfer path (e.g. in a switch along the data transfer path) of receiving the (E)CKD record that was sent from the HBA to the storage subsystem and then checking the checksum contained in the Checksum field of the emulated (E)CKD record (step 1417). Step 1417, if utilized, is performed utilizing a data integrity protection mechanism which calculates a checksum of all of the data blocks and all of the footers within the entirety of the emulated (E)CKD record and compares the calculated checksum and the checksum contained in the Checksum field of the emulated (E)CKD record. If the comparison results in a match, the emulated (E)CKD record is sent to the storage subsystem. On the other hand, if the comparison results in a mismatch, an error message is sent to the HBA and/or the host computer system. Such error messages may be tracked by the HBA and/or the host computer system to help identify weak spots in the data transfer path. Step 1417, if utilized, may additionally include, as discussed in more detail below with reference to FIGS. 16-17, the writing of a record integrity verification confirmation by the data integrity protection mechanism into the high performance block storage metadata unit of the emulated (E)CKD record.

For example, referring temporarily again to FIG. 15, a switch 1540 along the data transfer path 1550 may receive the emulated (E)CKD record that was sent from the HBA 1510 to the storage subsystem 1530. The switch contains a data integrity protection mechanism 1542, which generally corresponds in function to the data integrity protection mechanism 826 shown in FIG. 8. The data integrity protection mechanism 1542 checks the checksum contained in the Checksum field of the emulated (E)CKD record. The data integrity protection mechanism 1542 calculates a checksum of all of the data blocks and all of the footers within the entirety of the emulated (E)CKD record and compares the calculated checksum and the checksum contained in the Checksum field of the emulated (E)CKD record. If the comparison results in a match, the switch 1540 sends the emulated (E)CKD record to the storage subsystem 1530. On the other hand, if the comparison results in a mismatch, the switch 1540 sends an error message to the HBA 1510. In addition, as discussed in more detail below with reference to FIGS. 16-17, the data integrity protection mechanism 1542 may write a record integrity verification confirmation into the high performance block storage metadata unit of the emulated (E)CKD record.

Referring back to FIG. 14, the method 1400 continues with the emulated (E)CKD record being received at the storage subsystem (step 1420). For example, referring temporarily again to FIG. 15, the emulated (E)CKD record sent from the HBA 1510 is received by the storage subsystem 1530. As mentioned above, the storage subsystem 1530 preferably includes a data integrity protection mechanism 1534, which as discussed below, may be used to safeguard data integrity when the emulated (E)CKD record is written to disk (step 1425 in FIG. 14) and/or read from disk (step 1430 in FIG. 14).

In general, it is highly desirable to reject the read/write operations involving the corrupt data and/or to report the existence of corrupt data. This protects correct data in the system or device from being adversely impacted by the corrupt data during and/or subsequent to the read/write operation, and prevents the read/write operation from appearing to complete successfully. During a write operation in the storage subsystem, for example, it may be desirable for the data integrity protection mechanism 1534 to perform a data integrity verification step with respect to the emulated (E)CKD record received by the storage subsystem 1530 from the HBA 1510. If the data integrity verification step indicates the existence of corrupt data in the emulated (E)CKD record received from the HBA 1510, the write request from the HBA 1510 and/or the host computer system 1520 is rejected, the corrupt data is prevented from being written to the media, and a "corrupt data" error signal is returned to HBA 1510 and/or the host computer system 1520.

Referring back to FIG. 14, the method 1400 continues with the emulated (E)CKD record being written to disk in the storage subsystem (step 1425). Preferably, step 1425 includes an optional write data integrity verification step of checking the checksum contained in the Checksum field of the emulated (E)CKD record that was written on the disk. If utilized, this optional write data integrity verification step preferably occurs before the emulated (E)CKD record is "hardened" on the disk. That is, the emulated (E)CKD record may have been written on the disk—but incorrectly. In accordance with the preferred embodiments of the present invention, the emulated (E)CKD record is "hardened" on the disk only after its data integrity as written on the disk is verified. It is highly desirable to identify this type of data integrity problem early, i.e., while the emulated (E)CKD record is still readily available from the HBA for retransmission. This optional write data integrity verification step is performed utilizing a data integrity protection mechanism which calculates a checksum of all of the data blocks and all of the footers within the entirety of the emulated (E)CKD record that was written on the disk and compares the calculated checksum and the checksum contained in the Checksum field of the emulated (E)CKD record that was written on the disk. If the comparison results in a match, the emulated (E)CKD record is hardened on the disk. On the other hand, if the comparison results in a mismatch, an error message is sent to the HBA and/or the host computer system. Preferably, the error message causes the emulated (E)CKD record to be retransmitted from the HBA to the storage subsystem. Additionally, if utilized, this optional write data integrity verification step may additionally include, as discussed in more detail below with reference to FIGS. 16-17, the writing of a record integrity verification confirmation by the data integrity protection mechanism into the high performance block storage metadata unit of the emulated (E)CKD record.

For example, referring temporarily again to FIG. 15, the emulated (E)CKD record is written on a disk of a disk drive 1532 in the storage subsystem 1530. The storage subsystem 1530 contains a data integrity protection mechanism 1534, which generally corresponds in function to the data integrity protection mechanism 826 shown in FIG. 8. The data integrity protection mechanism 1534 preferably checks the checksum contained in the Checksum field of the emulated (E)CKD record as written on the disk. The data integrity protection mechanism 1534 calculates a checksum of all of the data blocks and all of the footers within the entirety of the emulated (E)CKD record as written on the disk and compares the calculated checksum and the checksum contained in the Checksum field of the emulated (E)CKD record as written on the disk. If the comparison results in a match, the storage controller of the storage subsystem 1530 hardens the emulated (E)CKD record on the disk. On the other hand, if the comparison results in a mismatch, the storage controller of the storage subsystem 1530 sends an error message to the HBA 1510 and/or the host computer system 1520. Preferably, the error message causes the emulated (E)CKD record to be retransmitted from the HBA 1510 to the storage subsystem 1530. In addition, as discussed in more detail below with reference to FIGS. 16-17, the data integrity protection mechanism 1542 may write a record integrity verification confirmation into the high performance block storage metadata unit of the emulated (E)CKD record.

Referring back to FIG. 14, the method 1400 continues with the emulated (E)CKD record being read from disk in the storage subsystem (step 1430). For example, step 1430 may occur in response to a read request from the host computer system, e.g., the host computer system requests the storage subsystem to read and transmit data earlier written in step 1420. Preferably, step 1430 includes an optional read data integrity verification step of checking the checksum contained in the Checksum field of the emulated (E)CKD record that was read from the disk. This optional read data integrity verification step is performed utilizing a data integrity protection mechanism which calculates a checksum of all of the data blocks and all of the footers within the entirety of the emulated (E)CKD record that was written on the disk and compares the calculated checksum and the checksum contained in the Checksum field of the emulated (E)CKD record that was written on the disk. If the comparison results in a match, the data integrity of the emulated (E)CKD record has been verified. On the other hand, if the comparison results in a mismatch, an error message is sent to the storage controller of the storage subsystem, and/or the HBA, and/or the host computer system. Preferably, the error message causes the storage controller to attempt re-reading the emulated (E)CKD record from the disk and/or to invoke an error correction procedure. Additionally, if utilized, this optional read data integrity verification step may additionally include, as discussed in more detail below with reference to FIGS. 16-17, the writing of a record integrity verification confirmation by the data integrity protection mechanism into the high performance block storage metadata unit of the emulated (E)CKD record.

For example, referring temporarily again to FIG. 15, the emulated (E)CKD record is read from a disk of a disk drive 1532 in the storage subsystem 1530. For example, the storage subsystem 1530 may have received a read request from the HBA 1510 of the host computer system 1520, e.g., the host computer system 1520 is requesting the storage subsystem 1530 to read and transmit data that was written earlier. The storage subsystem 1530 contains a data integrity protection mechanism 1534, which generally corresponds in function to the data integrity protection mechanism 826 shown in FIG. 8. The data integrity protection mechanism 1534 preferably checks the checksum contained in the Checksum field of the emulated (E)CKD record as read from the disk. The data integrity protection mechanism 1534 calculates a checksum of all of the data blocks and all of the footers within the entirety of the emulated (E)CKD record as read from the disk and compares the calculated checksum and the checksum contained in the Checksum field of the emulated (E)CKD record as read from the disk. If the comparison results in a match, the data integrity of the emulated (E)CKD record has been verified. On the other hand, if the comparison results in a mismatch, an error message is sent to the storage controller of the storage subsystem 1530, and/or to the HBA 1510, and/or the host computer system 1520. Preferably, the error message causes the storage controller of the storage subsystem 1530 to attempt re-reading the emulated (E)CKD record from the disk and/or to invoke an error correction procedure. In addition, as discussed in more detail below with reference to FIGS. 16-17, the data integrity protection mechanism 1542 may write a record integrity verification confirmation into the high performance block storage metadata unit of the emulated (E)CKD record.

Referring back to FIG. 14, the method 1400 continues with the emulated (E)CKD record being sent from the storage subsystem to the HBA (step 1435). For example, referring temporarily again to FIG. 15, the emulated (E)CKD record is sent from the storage subsystem 1530 along the data transfer path 1550 to the HBA 1510.

Referring back to FIG. 14, the method 1400 may continue with an optional step along the data transfer path (e.g. in a switch along the data transfer path) of receiving the (E)CKD record that was sent from the storage subsystem to the HBA, and then checking the checksum contained in the Checksum field of the emulated (E)CKD record (step 1437). Step 1437, if utilized, is performed utilizing a data integrity protection mechanism which calculates a checksum of all of the data blocks and all of the footers within the entirety of the emulated (E)CKD record and compares the calculated checksum and the checksum contained in the Checksum field of the emulated (E)CKD record. If the comparison results in a match, the emulated (E)CKD record is sent to the HBA. On the other hand, if the comparison results in a mismatch, an error message is sent to the HBA and/or the host computer system. Such error messages may be tracked by the HBA and/or the host computer system to help identify weak spots in the data transfer path. Step 1437, if utilized, may additionally include, as discussed in more detail below with reference to FIGS. 16-17, the writing of a record integrity verification confirmation by the data integrity protection mechanism into the high performance block storage metadata unit of the emulated (E)CKD record.

For example, referring temporarily again to FIG. 15, the switch 1542 along the data transfer path 1550 may receive the emulated (E)CKD record that was sent from the storage subsystem 1530 to the HBA 1510. The switch contains a data integrity protection mechanism 1542, which generally corresponds in function to the data integrity protection mechanism 826 shown in FIG. 8. The data integrity protection mechanism 1542 checks the checksum contained in the Checksum field of the emulated (E)CKD record. The data integrity protection mechanism 1542 calculates a checksum of all of the data blocks and all of the footers within the entirety of the emulated (E)CKD record and compares the calculated checksum and the checksum contained in the Checksum field of the emulated (E)CKD record. If the comparison results in a match, the switch 1540 sends the emulated (E)CKD record to the HBA 1510. On the other hand, if the comparison results in a mismatch, the switch 1540 sends an error message to the HBA 1510 and/or the host computer system 1520. In addition, as discussed in more detail below with reference to FIGS. 16-17, the data integrity protection mechanism 1542 may write a record integrity verification confirmation into the high performance block storage metadata unit of the emulated (E)CKD record.

Referring back to FIG. 14, the method 1400 continues with the emulated (E)CKD record being received at the HBA from the storage subsystem (step 1440). For example, referring temporarily again to FIG. 15, the emulated (E)CKD record sent from the storage subsystem 1530 is received by the HBA 1510.

Referring back to FIG. 14, the method 1400 continues with a data integrity protection mechanism of the HBA checking the checksum contained in the Checksum field of the emulated (E)CKD record that was received from the storage subsystem (step 1445). The data integrity protection mechanism calculates a checksum of all of the data blocks and all of the footers within the entirety of the emulated (E)CKD record that was received from the storage subsystem and compares the calculated checksum and the checksum contained in the Checksum field of the emulated (E)CKD record that was received from the storage subsystem. If the comparison results in a match, the data integrity of the emulated (E)CKD record has been verified. Once the data integrity protection mechanism verifies the data integrity of the emulated (E)CKD record, a translation mechanism reverse-translates the emulated (E)CKD record back into an (E)CKD record that is sent to the host computer system. The translation mechanism accomplishes this reverse-translation by stripping out the footers of the emulated (E)CKD record. On the other hand, if the comparison results in a mismatch, an error message is sent to the storage controller of the storage subsystem and/or the host computer system. Preferably, the error message causes the storage controller to attempt re-reading and re-transmitting the emulated (E)CKD record from the disk and/or to invoke an error correction procedure. Additionally, this data integrity verification step may additionally include, as discussed in more detail below with reference to FIGS. 16-17, the writing of a record integrity verification confirmation by the data integrity protection mechanism into the high performance block storage metadata unit of the emulated (E)CKD record.

For example, referring temporarily again to FIG. 15, the HBA contains a data integrity protection mechanism 1514, which generally corresponds in function to the data integrity protection mechanism 826 shown in FIG. 8. The data integrity protection mechanism 1514 checks the checksum contained in the Checksum field of the emulated (E)CKD record received from the storage subsystem 1530. The data integrity protection mechanism 1514 calculates a checksum of all of the data blocks and all of the footers within the entirety of the emulated (E)CKD record received from the storage subsystem 1530 and compares the calculated checksum and the checksum contained in the Checksum field of the emulated (E)CKD record received from the storage subsystem 1530. If the comparison results in a match, the data integrity of the emulated (E)CKD record has been verified. Once the data integrity protection mechanism 1514 verifies the data integrity of the emulated (E)CKD record, the translation mechanism 1512 reverse-translates the emulated (E)CKD record back into an (E)CKD record that is sent to the host computer system 1520. The translation mechanism 1512 accomplishes this reverse-translation by stripping out the footers of the emulated (E)CKD record. On the other hand, if the comparison results in a mismatch, the storage controller of the storage subsystem 1530 sends an error message to the storage subsystem 1530 and/or the host computer system 1520. Preferably, the error message causes the storage controller to attempt re-reading and re-transmitting the emulated (E)CKD record from the disk and/or to invoke an error correction procedure. In addition, as discussed in more detail below with reference to FIGS. 16-17, the data integrity protection mechanism 1542 may write a record integrity verification confirmation into the high performance block storage metadata unit of the emulated (E)CKD record.

Figure 16:
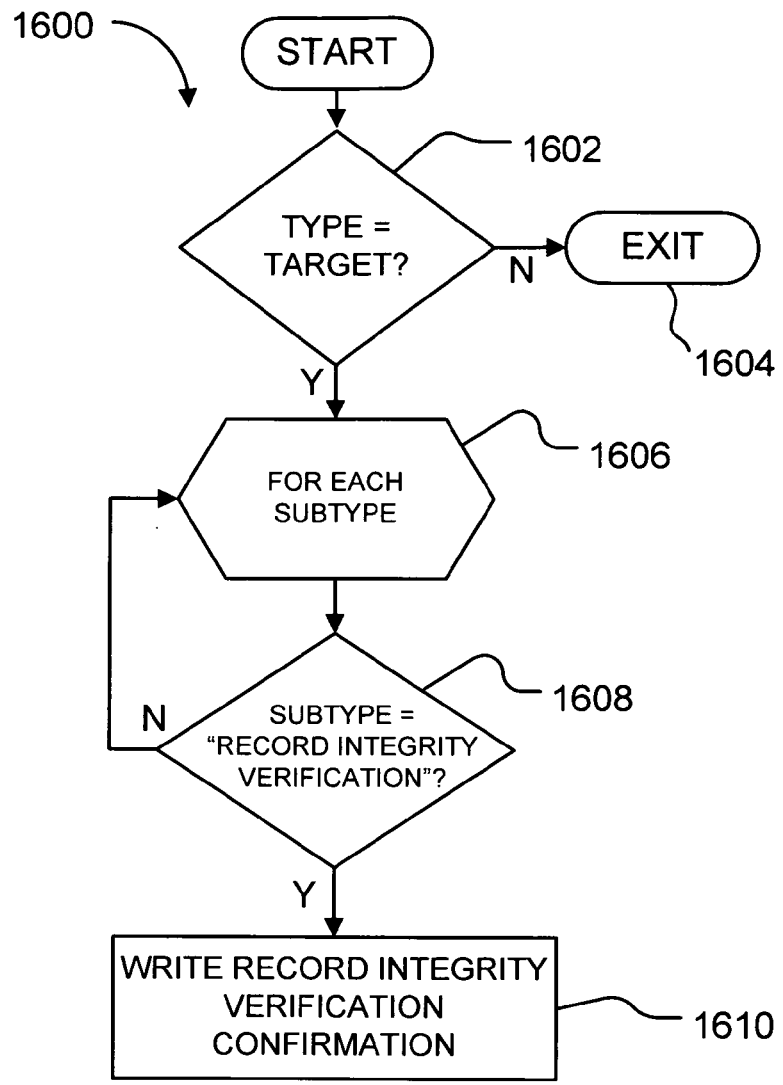
FIG. 16 is a flow diagram illustrating a method for utilizing high performance block storage metadata to provide data protection for a variable length record and that implements a "record integrity verification confirmation" application in accordance with the preferred embodiments of the present invention.

FIG. 16 is a flow diagram illustrating a method 1600 for utilizing high performance block storage metadata to provide data protection for a variable length record and that implements a "record integrity verification confirmation" application in accordance with the preferred embodiments of the present invention. In the method 1600, the steps discussed below (steps 1602-1610) are performed. These steps are set forth in their preferred order. It must be understood, however, that the various steps may occur at different times relative to one another than shown, or may occur simultaneously. Moreover, those skilled in the art will appreciate that one or more of the steps may be omitted. The method 1600 begins with the data integrity protection mechanism (e.g., in the HBA 1510, the storage subsystem 1530, and/or the switch 1540 shown in FIG. 15) determining whether a Type field (e.g., the Type field 1140 shown in FIG. 11) in a HPBS metadata unit contains a target metadata type number (step 1602). The target metadata type number may be, for example, a metadata type number that was assigned to a particular software and/or hardware vendor by an appropriate standards body and/or a metadata type number indicative of whether the emulated record is an emulated ECKD record or an emulated CKD record.

If the Type field does not contain the target metadata type number (step 1602=no), the method 1600 exits (step 1604). On the other hand, if the Type field contains the target metadata type number (step 1602=yes), the method 1600 continues with the data integrity protection mechanism, for each Subtype field (e.g., the Subtype field 1310 in each of the Information Units (IUs) shown in FIG. 13) in the HPBS metadata unit (step 1606), determining whether the Subtype field contains an "record integrity verification" value (step 1608).

If the Subtype field does not contain the "record integrity verification" value (step 1608=no), the method 1600 returns to step 1606. Step 1606 repeats step 1608 for each Subtype field in the HPBS metadata unit. If the Subtype field contains the "record integrity verification" value (step 1608=yes), the method 1600 continues with the data integrity protection mechanism writing a record integrity verification confirmation in the HPBS metadata unit (step 1610) once the data integrity protection mechanism has checked the checksum (e.g., steps 1417, 1425, 1430, 1437, and/or 1445 shown in FIG. 14).

The data integrity verification mechanism may, for example, cause a "verification status" value in the HPBS metadata unit to be changed and/or cause a "date verification completed" value to be written into the HPBS metadata unit. As described in more detail below with reference to FIG. 17, in accordance with the preferred embodiments of the present invention the "verification status" value and the "date verification completed" value are respectively contained in a "verification status" field and a "date verification completed" field of the IU having the Subtype field that contains the "record integrity verification" value. Preferably, the "verification status" value indicates a status with respect to the step of checking the checksum (e.g. the emulated record's data integrity has been verified, the emulated record's data integrity has not been subject to verification, the emulated record has been shown to be corrupt, an error message has been sent, etc.). The "date verification completed" value preferably indicates a date and time at which the step of checking the checksum was completed successfully.

Figure 17:
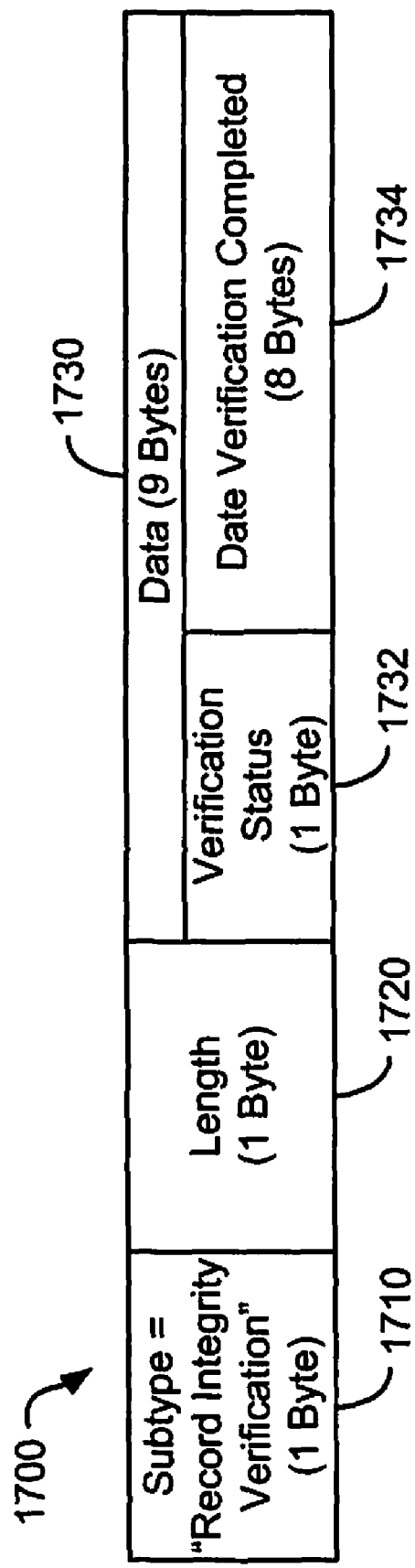
FIG. 17 is a schematic diagram illustrating an example data structure for an information unit for use with a "record integrity verification confirmation" application in accordance with the preferred embodiments of the present invention.

FIG. 17 is a schematic diagram illustrating an example data structure for an information unit 1700 for use with a "record integrity verification confirmation" application (method 1600 shown in FIG. 16) in accordance with the preferred embodiments of the present invention. The information unit 1700 corresponds with one of the IUs 1305 shown in FIG. 13. The information unit 1700 includes a subtype field 1710 (e.g., 1 byte) having a "record integrity verification" value, a length of data field 1720 (e.g., 1 byte), and a data field 1730 (e.g., 9 bytes). The data field 1730 includes a "verification status field" 1732 (e.g., 1 byte), and a "date verification completed" field 1734 (e.g., 8 bytes).

One skilled in the art will appreciate that many variations are possible within the scope of the present invention. For example, the mechanism for utilizing high performance block storage metadata in accordance with the preferred embodiments of the present invention may be used within the context of other applications within the scope of the present invention. Thus, while the present invention has been particularly shown and described with reference to preferred embodiments thereof, it will be understood by those skilled in the art that changes in form and details may be made therein without departing from the spirit and scope of the present invention.

What is claimed is:

1. A computer-implemented method for utilizing high performance block storage metadata to provide data protection for a variable length record, comprising the steps of:
   receiving a variable length record;
   generating an emulated variable length record that emulates a variable length record, the emulated variable length record comprising a sequence of extended fixed-length blocks, each of the extended fixed-length blocks comprising a data block and a footer, wherein a confluence of the footers defines a high performance block storage metadata unit that is associated with the emulated variable length record, wherein the high performance metadata unit includes a Checksum field containing a checksum that covers at least the confluence of the footers, and wherein the confluence of the footers includes one or more information units each spanning across at least two of the footers in the confluence of the footers from one of the footers to another of the footers.

2. The computer-implemented method as recited in claim 1, wherein the checksum in the Checksum field covers all of the data blocks and all of the footers within the entirety of the emulated variable length record, and wherein the step of receiving a variable length record includes the step of receiving either a Count-Key-Data (CKD) record or an Extended-Count-Key-Data (ECKD) record.

3. A computer-implemented method for utilizing high performance block storage metadata to provide data protection for a variable length record, comprising the steps of:
   receiving an emulated variable length record that emulates a variable length record, the emulated variable length record comprising a sequence of extended fixed-length blocks, each of the extended fixed-length blocks comprising a data block and a footer, wherein a confluence of the footers defines a high performance block storage metadata unit that is associated with the emulated variable length record, wherein the high performance metadata unit includes a Checksum field containing a checksum that covers at least the confluence of the footers, and wherein the confluence of the footers includes one or more information units each spanning across at least two of the footers in the confluence of the footers from one of the footers to another of the footers;

checking the checksum upon the occurrence of one or more of the following events: during transit of the emulated variable length record to a disk drive; during a hardening step of a process for writing the emulated variable length record to a disk; during a verification step of a process for reading the emulated variable length record from a disk; and during transit of the emulated variable length record from a disk drive.

4. The computer-implemented method as recited in claim 3, wherein the emulated variable length record emulates either a Count-Key-Data (CKD) record or an Extended-Count-Key-Data (ECKD) record, and wherein the step of checking the checksum comprises the steps of:

calculating a checksum of all of the data blocks and all of the footers within the entirety of the emulated variable length record;

comparing the checksum contained in the Checksum field to the checksum calculated in the calculating step.

5. The computer-implemented method as recited in claim 3, further comprising the step of:

writing a record integrity verification confirmation into the high performance block storage metadata unit after the checking step has been completed, wherein the step of writing the record integrity verification confirmation includes the step of writing the record integrity verification confirmation into one of the one or more information units spanning across at least two of the footers in the confluence of the footers from one of the footers to another of the footers.

6. The computer-implemented method as recited in claim 5, wherein the step of writing a record integrity verification confirmation includes the steps of:

changing a "verification status" value in the high performance block storage metadata unit;

writing a "date verification completed" value into the high performance block storage metadata unit, wherein the "date verification completed" value indicates at least one of the date and the time the checking step was completed.

7. A computer-implemented method for utilizing high performance block storage metadata to provide data protection for a variable length record, comprising the steps of:

receiving a variable length record at a host bus adapter (HBA) of a host system;

generating, at the HBA, an emulated variable length record that emulates a variable length record that is either a Count-Key-Data (CKD) record or an Extended-Count-Key-Data (ECKD) record, the emulated variable length record comprising a sequence of extended fixed-length blocks, each of the extended fixed-length blocks comprising a data block and a footer, wherein a confluence of the footers defines a high performance block storage metadata unit that is associated with the emulated variable length record, wherein the high performance metadata unit includes a Checksum field containing a checksum that covers all of the data blocks and all of the footers within the entirety of the emulated variable length record, and wherein the confluence of the footers includes one or more information units each spanning across at least two of the footers in the confluence of the footers from one of the footers to another of the footers;

sending, over a data transfer path from the HBA to a storage subsystem, the emulated variable length record, wherein the storage subsystem includes at least one disk drive;

receiving, at the storage subsystem, the emulated variable length record that was sent from the HBA;

writing, on a disk of the at least one disk drive of the storage subsystem, the emulated variable length record that was received at the storage subsystem during the receiving step;

reading, from the disk of the at least one disk drive of the storage subsystem, the emulated variable length record that was written on the disk during the writing step;

sending, over a data transfer path from the storage subsystem to the HBA, the emulated variable length record that was read from the disk during the reading step;

receiving, at the HBA, the emulated variable length record that was sent from the storage subsystem;

checking, at the HBA, the checksum contained in the Checksum field of the emulated variable length record that was received at the HBA during the receiving step.

8. The computer-implemented method as recited in claim 7, wherein the step of checking the checksum comprises the steps of:

calculating a checksum of all of the data blocks and all of the footers within the entirety of the emulated variable length record that was received at the HBA during the receiving step;

comparing the checksum calculated in the calculating step and the checksum contained in the Checksum field of the emulated variable length record that was received at the HBA during the receiving step.

9. The computer-implemented method as recited in claim 7, further comprising the step of:

writing, at the HBA, a record integrity verification confirmation into the high performance block storage metadata unit after the checking step has been completed, wherein the step of writing the record integrity verification confirmation includes the step of writing the record integrity verification confirmation into one of the one or more information units spanning across at least two of the footers in the confluence of the footers from one of the footers to another of the footers.

10. The computer-implemented method as recited in claim 7, wherein a switch is interposed in the data transfer path from the HBA to the storage subsystem, the computer-implemented method further comprising the steps of:

receiving, at the switch, the emulated variable length record that was sent from the HBA to the storage subsystem;

checking, at the switch, the checksum contained in the Checksum field of the emulated variable length record that was received at the switch during the receiving step.

11. The computer-implemented method as recited in claim 10, wherein the step of checking, at the switch, the checksum comprises the steps of:

calculating a checksum of all of the data blocks and all of the footers within the entirety of the emulated variable length record that was received at the switch during the receiving step;

comparing the checksum calculated in the calculating step and the checksum contained in the Checksum field of the emulated variable length record that was received at the switch during the receiving step;

if the comparing step results in a match, then the computer-implemented method further comprises the step of the switch sending the emulated variable length record to the storage subsystem;

if the comparing step results in a mismatch, then the computer-implemented method further comprises the step of the switch sending an error message to the HBA.

12. The computer-implemented method as recited in claim 11, wherein if the comparing step results in a match, then the computer-implemented method further comprises the step of:
    writing, at the switch, a record integrity verification confirmation into the high performance block storage metadata unit after the checking step has been completed, wherein the step of writing the record integrity verification confirmation includes the step of writing the record integrity verification confirmation into one of the one or more information units spanning across at least two of the footers in the confluence of the footers from one of the footers to another of the footers.

13. The computer-implemented method as recited in claim 7, wherein a switch is interposed in the data transfer path from the storage subsystem to the HBA, the computer-implemented method further comprising the steps of:
    receiving, at the switch, the emulated variable length record that was sent from the storage subsystem to the HBA;
    checking, at the switch, the checksum contained in the Checksum field of the emulated variable length record that was received at the switch during the receiving step.

14. The computer-implemented method as recited in claim 13, wherein the step of checking, at the switch, the checksum comprises the steps of:
    calculating a checksum of all of the data blocks and all of the footers within the entirety of the emulated variable length record that was received at the switch during the receiving step;
    comparing the checksum calculated in the calculating step and the checksum contained in the Checksum field of the emulated variable length record that was received at the switch during the receiving step;
    if the comparing step results in a match, then the computer-implemented method further comprises the step of the switch sending the emulated variable length record to the HBA;
    if the comparing step results in a mismatch, then the computer-implemented method further comprises the step of the switch sending an error message to the storage subsystem.

15. The computer-implemented method as recited in claim 14, wherein if the comparing step results in a match, then the computer-implemented method further comprises the step of:
    writing, at the switch, a record integrity verification confirmation into the high performance block storage metadata unit after the checking step has been completed, wherein the step of writing the record integrity verification confirmation includes the step of writing the record integrity verification confirmation into one of the one or more information units spanning across at least two of the footers in the confluence of the footers from one of the footers to another of the footers.

16. The computer-implemented method as recited in claim 7, further comprising the steps of:
    checking, at the storage subsystem, the checksum contained in the Checksum field of the emulated variable length record that was written on the disk during the writing step or read from the disk during the reading step.

17. The computer-implemented method as recited in claim 16, wherein the step of checking, at the storage subsystem, occurs during a hardening step of a process for writing the emulated variable length record to the disk.

18. The computer-implemented method as recited in claim 16, wherein the step of checking, at the storage subsystem, the checksum comprises the steps of:
    calculating a checksum of all of the data blocks and all of the footers within the entirety of the emulated variable length record that was written on the disk during the writing step;
    comparing the checksum calculated in the calculating step and the checksum contained in the Checksum field of the emulated variable length record that was written on the disk during the writing step;
    if the comparing step results in a match, then the computer-implemented method further comprises the step of hardening the writing of the emulated variable length record to the disk;
    if the comparing step results in a mismatch, then the computer-implemented method further comprises the step of the storage subsystem sending an error message to the HBA.

19. The computer-implemented method as recited in claim 18, wherein if the comparing step results in a match, then the computer-implemented method further comprises the step of:
    writing, at the storage subsystem, a record integrity verification confirmation into the high performance block storage metadata unit after the checking step has been completed, wherein the step of writing the record integrity verification confirmation includes the step of writing the record integrity verification confirmation into one of the one or more information units spanning across at least two of the footers in the confluence of the footers from one of the footers to another of the footers.

20. The computer-implemented method as recited in claim 16, wherein the step of checking, at the storage subsystem, occurs during a verification step of a process for reading the emulated variable length record from the disk.

21. The computer-implemented method as recited in claim 16, wherein the step of checking, at the storage subsystem, the checksum comprises the steps of:
    calculating a checksum of all of the data blocks and all of the footers within the entirety of the emulated variable length record that was read from the disk during the reading step;
    comparing the checksum calculated in the calculating step and the checksum contained in the Checksum field of the emulated variable length record that was read from the disk during the reading step;
    if the comparing step results in a mismatch, then the computer-implemented method further comprises the step of sending an error message.

22. The computer-implemented method as recited in claim 21, wherein if the comparing step results in a match, then the computer-implemented method further comprises the step of:
    writing, at the storage subsystem, a record integrity verification confirmation into the high performance block storage metadata unit after the checking step has been completed, wherein the step of writing the record integrity verification confirmation includes the step of writing the record integrity verification confirmation into one of the one or more information units spanning across at least two of the footers in the confluence of the footers from one of the footers to another of the footers.

* * * * *